(12) United States Patent
Haelen

(10) Patent No.: US 12,056,143 B2
(45) Date of Patent: Aug. 6, 2024

(54) DATA PROCESSING WITH INTEGRATED METADATA GENERATION AND STORAGE

(71) Applicant: Insight Direct USA, Inc., Tempe, AZ (US)

(72) Inventor: Bennie Alfons Haelen, Anthem, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 17/709,908

(22) Filed: Mar. 31, 2022

(65) Prior Publication Data

US 2023/0315749 A1 Oct. 5, 2023

(51) Int. Cl.
G06F 17/00 (2019.01)
G06F 16/25 (2019.01)

(52) U.S. Cl.
CPC .................. *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | |
|---|---|---|
| 6,161,103 A | 12/2000 | Rauer et al. |
| 6,189,004 B1 | 2/2001 | Rassen et al. |
| 6,212,524 B1 | 4/2001 | Weissman et al. |
| 7,461,076 B1 | 12/2008 | Weissman et al. |
| 7,475,080 B2 | 1/2009 | Chowdhary et al. |
| 7,681,185 B2 | 3/2010 | Kapoor et al. |
| 7,720,804 B2 | 5/2010 | Fazal et al. |
| 7,739,224 B1 | 6/2010 | Weissman et al. |

(Continued)

FOREIGN PATENT DOCUMENTS

| | | |
|---|---|---|
| AU | 2017224831 A1 | 8/2018 |
| CA | 2795757 A1 | 5/2013 |

(Continued)

OTHER PUBLICATIONS

Anonymous: "Slowly changing dimension," Feb. 6, 2022 (Feb. 6, 2022), XP093057274, retrieved on Jun. 23, 2023.

(Continued)

*Primary Examiner* — Hung D Le
(74) *Attorney, Agent, or Firm* — Kinney & Lange, P.A.

(57) ABSTRACT

A method of generating and storing metadata in a data processing system includes defining metadata sets of process definition metadata based on a process definition of the data processing system. The metadata sets include a first set of metadata corresponding to a processing step of the data processing system, a second set of metadata corresponding to a processing step successor, and a third set of metadata corresponding to a data object that is produced or consumed by the processing step in the data processing system. The method further includes executing one or more steps of the data processing system according to the process definition and generating runtime metadata during an execution of the one or more data processing system steps. The method further includes storing the runtime metadata and forming a metadata data store that integrates the runtime metadata and the metadata sets of process definition metadata.

18 Claims, 8 Drawing Sheets

(56) References Cited

U.S. PATENT DOCUMENTS

| | | | |
|---|---|---|---|
| 7,747,563 | B2 | 6/2010 | Gehring |
| 7,792,921 | B2* | 9/2010 | Taylor ..................... H04L 67/51 |
| | | | 707/602 |
| 7,844,570 | B2 | 11/2010 | Netz et al. |
| 8,311,975 | B1 | 11/2012 | Gonsalves |
| 9,477,451 | B1* | 10/2016 | O'Farrell ................. G06F 8/443 |
| 9,727,591 | B1 | 8/2017 | Sharma et al. |
| 9,740,992 | B2 | 8/2017 | Fazal et al. |
| 10,095,766 | B2 | 10/2018 | Kapoor et al. |
| 10,122,783 | B2 | 11/2018 | Qiao et al. |
| 10,360,239 | B2 | 7/2019 | Kapoor et al. |
| 10,469,585 | B2 | 11/2019 | Zhao et al. |
| 10,599,678 | B2 | 3/2020 | Kapoor et al. |
| 10,642,854 | B2 | 5/2020 | Pattnaik et al. |
| 10,719,480 | B1 | 7/2020 | Todd |
| 10,853,338 | B2 | 12/2020 | Meacham et al. |
| 10,860,599 | B2 | 12/2020 | McCluskey et al. |
| 10,885,051 | B1 | 1/2021 | Peters et al. |
| 10,997,243 | B1 | 5/2021 | Paulus et al. |
| 11,030,166 | B2 | 6/2021 | Swamy et al. |
| 11,119,980 | B2 | 9/2021 | Szczepanik et al. |
| 11,137,987 | B2 | 10/2021 | Namarvar et al. |
| 11,487,777 | B1 | 11/2022 | Bose et al. |
| 2006/0080156 | A1 | 4/2006 | Baughn et al. |
| 2006/0253830 | A1* | 11/2006 | Rajanala ................... G06F 8/36 |
| | | | 717/105 |
| 2007/0203933 | A1 | 8/2007 | Iversen et al. |
| 2007/0282889 | A1* | 12/2007 | Ruan ......................... G06F 8/24 |
| | | | 707/999.102 |
| 2008/0046803 | A1 | 2/2008 | Beauchamp et al. |
| 2008/0183744 | A1* | 7/2008 | Adendorff .............. G06Q 10/10 |
| | | | 707/999.102 |
| 2008/0288448 | A1 | 11/2008 | Agredano et al. |
| 2009/0055439 | A1 | 2/2009 | Pai et al. |
| 2009/0265335 | A1 | 10/2009 | Hoffman et al. |
| 2009/0281985 | A1 | 11/2009 | Aggarwal |
| 2010/0106747 | A1 | 4/2010 | Honzal et al. |
| 2010/0211539 | A1 | 8/2010 | Ho |
| 2011/0113005 | A1 | 5/2011 | He et al. |
| 2011/0264618 | A1 | 10/2011 | Potdar et al. |
| 2012/0005151 | A1 | 1/2012 | Vasudevan et al. |
| 2012/0173478 | A1 | 7/2012 | Jensen et al. |
| 2013/0275365 | A1 | 10/2013 | Wang et al. |
| 2014/0244573 | A1 | 8/2014 | Gonsalves |
| 2014/0304217 | A1 | 10/2014 | Nowakowski et al. |
| 2015/0169602 | A1* | 6/2015 | Shankar ................ G06F 16/908 |
| | | | 707/825 |
| 2015/0317350 | A1* | 11/2015 | Roy-Faderman ....... G06F 16/21 |
| | | | 707/702 |
| 2016/0147850 | A1 | 5/2016 | Winkler et al. |
| 2016/0241579 | A1 | 8/2016 | Roosenraad et al. |
| 2017/0011087 | A1 | 1/2017 | Hyde et al. |
| 2017/0116307 | A1 | 4/2017 | Kapoor et al. |
| 2017/0132357 | A1 | 5/2017 | Brewerton et al. |
| 2017/0286255 | A1* | 10/2017 | Kinnear .............. G06F 9/45504 |
| 2018/0025035 | A1 | 1/2018 | Xia et al. |
| 2018/0095952 | A1* | 4/2018 | Rehal ..................... G06F 16/907 |
| 2018/0246944 | A1 | 8/2018 | Yelisetti et al. |
| 2019/0243836 | A1 | 8/2019 | Nanda et al. |
| 2019/0332495 | A1* | 10/2019 | Fair ..................... G06F 16/1734 |
| 2020/0019558 | A1 | 1/2020 | Okorafor et al. |
| 2020/0067789 | A1 | 2/2020 | Khuti et al. |
| 2020/0151198 | A1 | 5/2020 | Wang |
| 2020/0379985 | A1* | 12/2020 | Athavale ............... G06F 16/212 |
| 2021/0056084 | A1 | 2/2021 | Guha et al. |
| 2021/0081848 | A1 | 3/2021 | Polleri et al. |
| 2021/0117437 | A1 | 4/2021 | Gibson |
| 2021/0133189 | A1 | 5/2021 | Prado et al. |
| 2021/0135772 | A1* | 5/2021 | Brown ................... H04H 60/73 |
| 2021/0173846 | A1 | 6/2021 | Verma et al. |
| 2021/0232603 | A1 | 7/2021 | Sundaram et al. |
| 2021/0232604 | A1 | 7/2021 | Sundaram et al. |
| 2021/0271568 | A1* | 9/2021 | Abdul Rasheed .. G06F 16/2379 |
| 2021/0326717 | A1 | 10/2021 | Mueller et al. |
| 2022/0171738 | A1* | 6/2022 | Lee ....................... G06F 16/172 |
| 2022/0207418 | A1 | 6/2022 | Cardoso et al. |
| 2022/0309324 | A1* | 9/2022 | Nama .................... G06N 3/045 |
| 2022/0350674 | A1* | 11/2022 | Velasco ................. G06F 9/5055 |
| 2023/0015688 | A1* | 1/2023 | Durakovic .......... G06F 11/3624 |
| 2023/0168895 | A1* | 6/2023 | Shah ................... G06F 9/30036 |
| | | | 707/602 |

FOREIGN PATENT DOCUMENTS

| | | |
|---|---|---|
| CN | 112597218 A | 4/2021 |
| CN | 112883091 A | 6/2021 |
| EP | 2079020 A1 | 7/2009 |
| IN | 2606MUM2009 A | 2/2012 |
| IN | 201914044380 A | 11/2019 |
| WO | 2020092291 A1 | 5/2020 |

OTHER PUBLICATIONS

International Search Report and Written Opinion for International Application No. PCT/US2023/016915, dated Jul. 4, 2023, 14 pages.
Malhotra Gaurav: "Get started quickly using templates in Azure Data Factory," Feb. 11, 2019 (Feb. 11, 2019), XP093057259, retrieved on Jun. 23, 2023.
Partial International Search and Provisional Opinion for International Application No. PCT/US2023/016919, dated Jul. 11, 2023, 14 pages.
Xu Ye: "Data Migration from on-premise relational Data Warehouse to Azure using Azure Data Factory," Oct. 2018 (Oct. 2018), XP093057148 retrieved Jun. 23, 2023.
Yan Zhao et al.: "Data Lake Ingestion Management," arxiv.org, Cornell University Library, 201 Olin Library Cornell University Ithaca, NY 14856, Jul. 5, 2021 (Jul. 5, 2021), XP091008365, section 2.
International Search and Written Opinion for International Application No. PCT/US2023/016919, dated Sep. 1, 2023, 19 pages.
Dominik Jens Elias Waibel et al.: "InstantDL: an easy-to-use deep learning pipeline for image segmentation and classification," BMC Bioinformatics, Biomed Central LTD, London, UK, vol. 22, No. 1, Mar. 2, 2021 (Mar. 2, 2021).
International Search Report and Written Opinion for International Application No. PCT/US2023/016922, dated Jun. 28, 2023, 10 pages.
International Search Report and Written Opinion for International Application No. PCT/US2023/016925, dated Sep. 20, 2023, 9 pages.

* cited by examiner

DATA PROCESSING WITH INTEGRATED METADATA GENERATION AND STORAGE

BACKGROUND

The present disclosure relates generally to data processing, and more specifically to generating and storing metadata.

Organizations use business intelligence (BI) technologies to generate actionable business insights and other analytics from large data sets (i.e., big data). Business data is often stored in various data sources, including on-premises data stores and cloud data stores. An organization may want to aggregate data from its various data sources in some way to provide, for example, a holistic view of the business or other insights.

To analyze its business data, an organization can aggregate the data in a centralized location, such as a cloud-based data lake, via a data ingestion pipeline. Two common data ingestion procedures that may be used for aggregating data are extract-transform-load (ETL) and extract-load-transform (ELT). In an ETL procedure, data is extracted from data sources, transformed using a series of rules or functions to prepare it for loading into an end target store, and loaded into the end target store. ELT is a variation of ETL. In an ELT procedure, data extracted from the data sources is loaded into the end target store before any transformation steps. Either ETL or ELT can be used for ingesting data, depending on the use case.

Data warehouses are a type of data store that can be used to organize business data in a format that is more approachable for analyzing the data. A typical data warehouse model can include dimension and fact tables, which are two types of relational tables. Fact tables record measurements or metrics (i.e., facts) for an event, such as a business process. Dimension tables are companion tables to fact tables that store descriptive information or attributes (i.e., dimensions) about the facts. Each fact table can reference several dimension tables. Star and snowflake schemas are database organizations where one or more fact tables reference a number of dimension tables.

Organizations can build fully custom data movement or processing components and systems or can utilize commercially available platforms, such as Microsoft Azure Data Factory or Amazon AWS Data Pipeline, to create custom workflows, i.e., pipelines, for moving and transforming data.

SUMMARY

In one example, a method of generating and storing metadata in a data processing system includes defining metadata sets of process definition metadata based on a process definition of the data processing system. The metadata sets include a first set of metadata corresponding to a processing step of the data processing system, a second set of metadata corresponding to a processing step successor that succeeds the processing step in the data processing system, and a third set of metadata corresponding to a data object that is produced or consumed by the processing step in the data processing system. The method further includes executing one or more steps of the data processing system via a computer device according to the process definition and generating runtime metadata during an execution of the one or more data processing system steps. The runtime metadata includes metadata that corresponds to an instance of the processing step and metadata that corresponds to an instance of the data object. The method further includes storing the runtime metadata during the execution of the one or more data processing system steps and forming a metadata data store that integrates the runtime metadata and the metadata sets of process definition metadata.

In another example, a data processing system for organizing data into a data warehouse includes a metadata data store including metadata sets of process definition metadata that are based on a process definition of the data processing system. The metadata sets include a first set of metadata corresponding to a processing step of the data processing system, a second set of metadata corresponding to a processing step successor that succeeds the processing step in the data processing system, and a third set of metadata corresponding to a data object that is produced or consumed by the processing step in the data processing system. The system further includes one or more processors and computer-readable memory encoded with instructions that, when executed by the one or more processors, cause the data processing system to access the process definition; execute the one or more steps of the data processing system according to the process definition; generate runtime metadata during an execution of the one or more data processing system steps; and store the runtime metadata in the metadata data store during the execution of the one or more data processing system steps such that the metadata data store integrates the runtime metadata and the metadata sets of process definition metadata. The runtime metadata includes metadata that corresponds to an instance of the processing step and metadata that corresponds to an instance of the data object.

DETAILED DESCRIPTION

Dimension and Fact Table Creation for Data Warehouse Using Templates

According to techniques of this disclosure, templates for creating dimension and fact tables for a data warehouse include an ordered sequence of steps backed by classes of code that are organized based on common methods, dimension table-specific methods, fact table-specific methods, auditing methods, and transformation processing methods. The templates greatly reduce the time needed to build a data warehouse with dimension and fact tables, and the templates are both reusable and readily modifiable. The data processing system disclosed herein, including the templates for creating dimension and fact tables, and corresponding methods are described below with reference to FIGS. 1-5.

Figure 1:
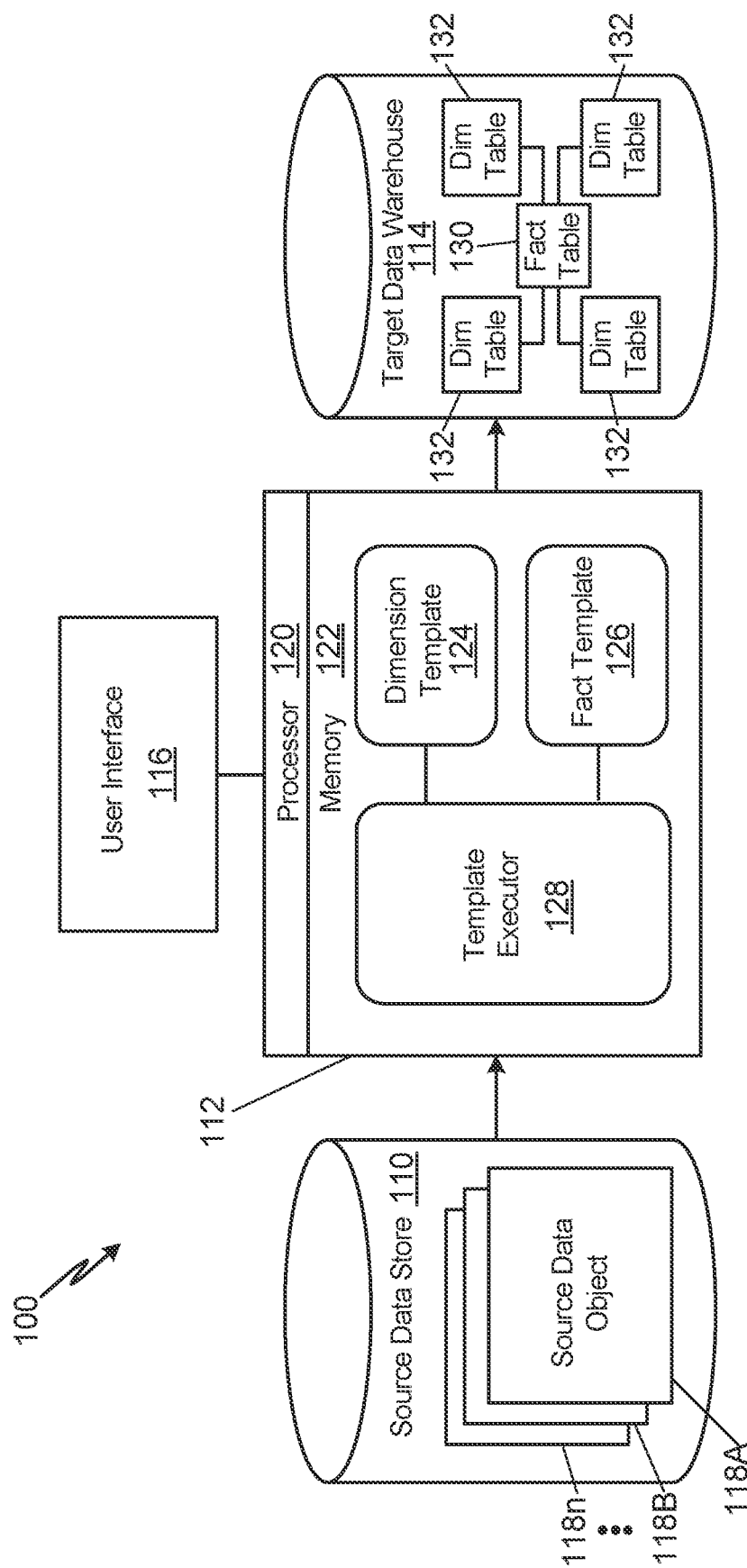
FIG. 1 is a schematic block diagram of a data processing system that includes templates for creating dimension and fact tables.
Figure 2:
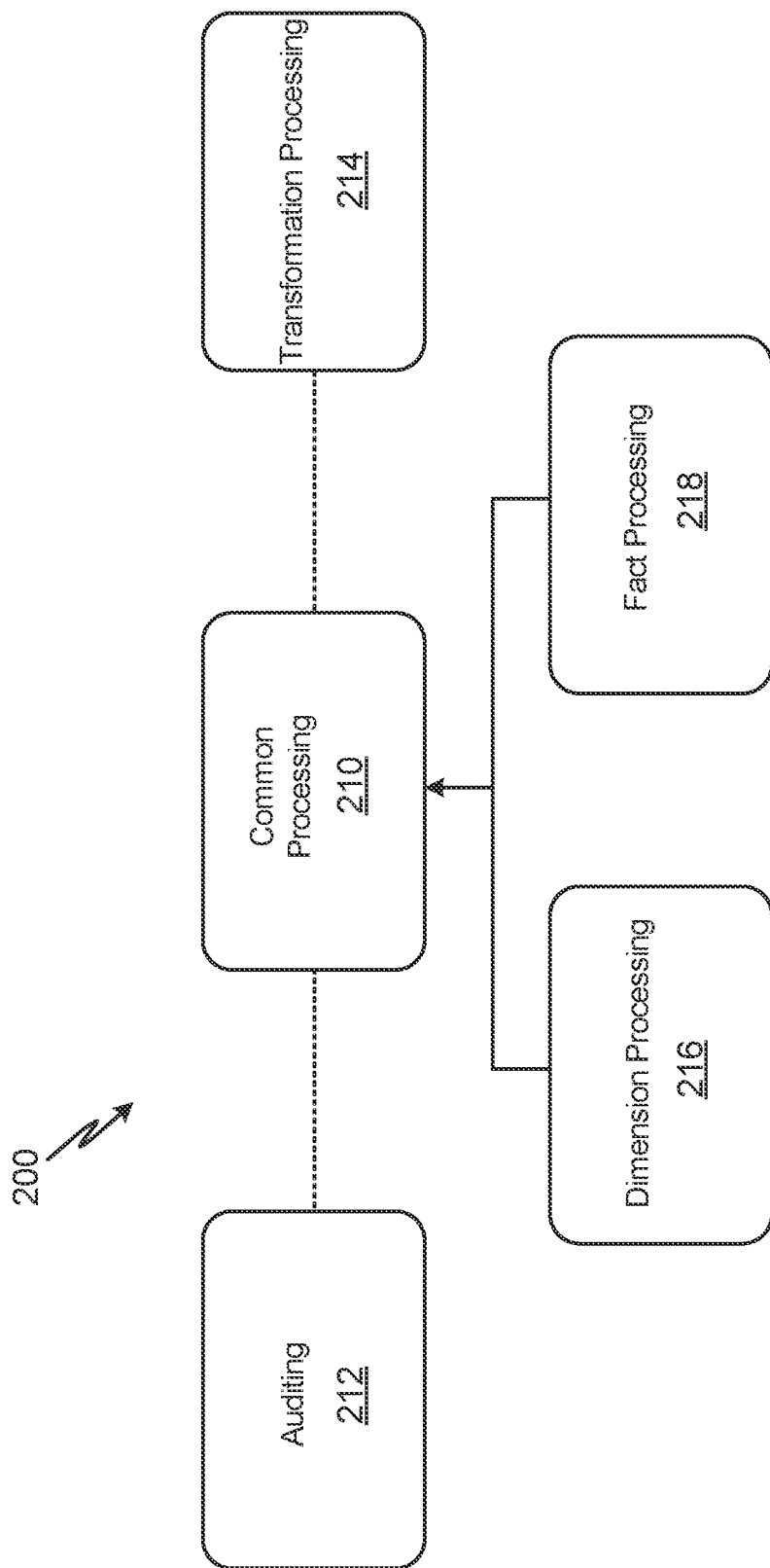
FIG. 2 is a schematic block diagram showing details of a class infrastructure for the templates of FIG. 1.
Figure 3:
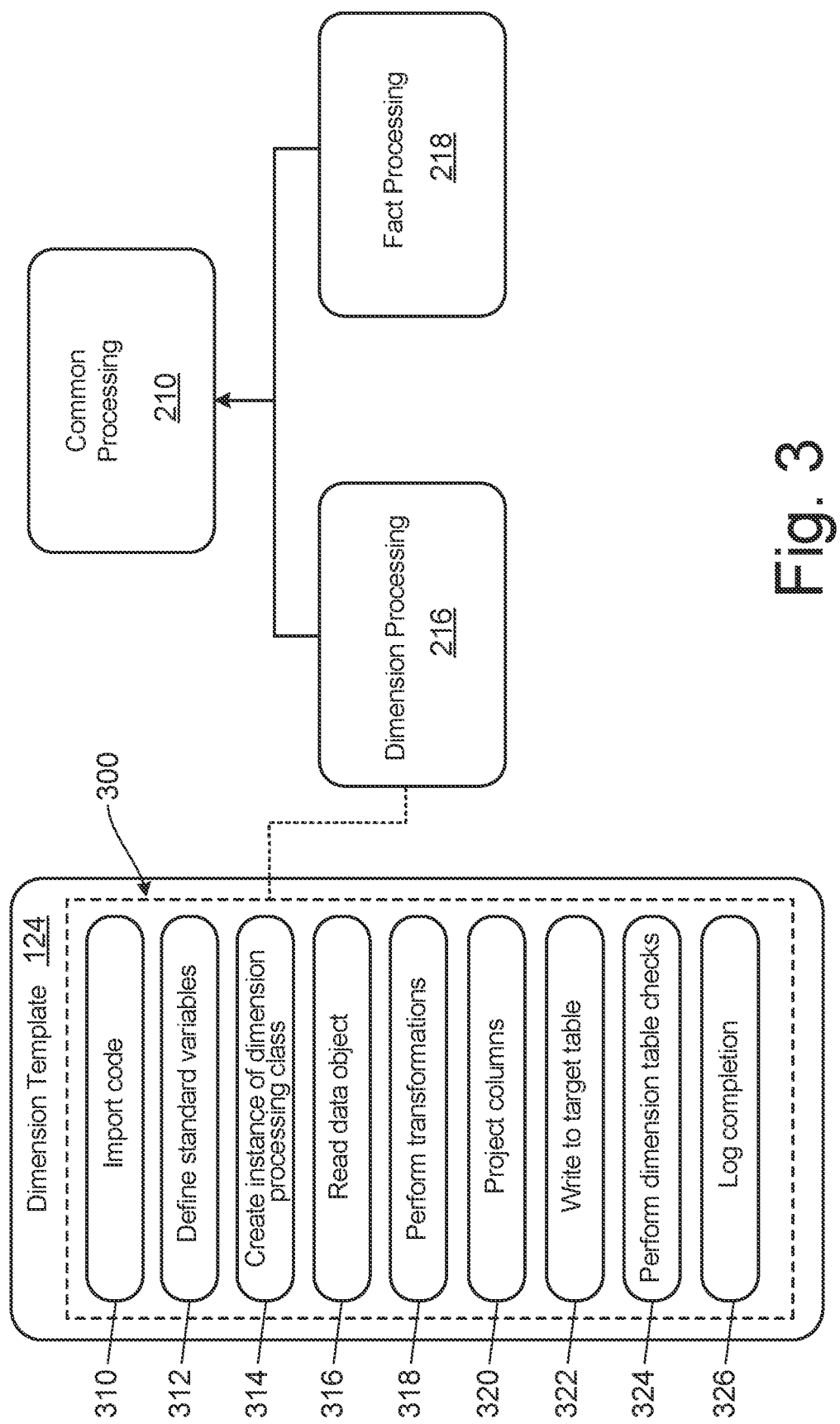
FIG. 3 is a schematic block diagram showing details of an example dimension template.
Figure 4:
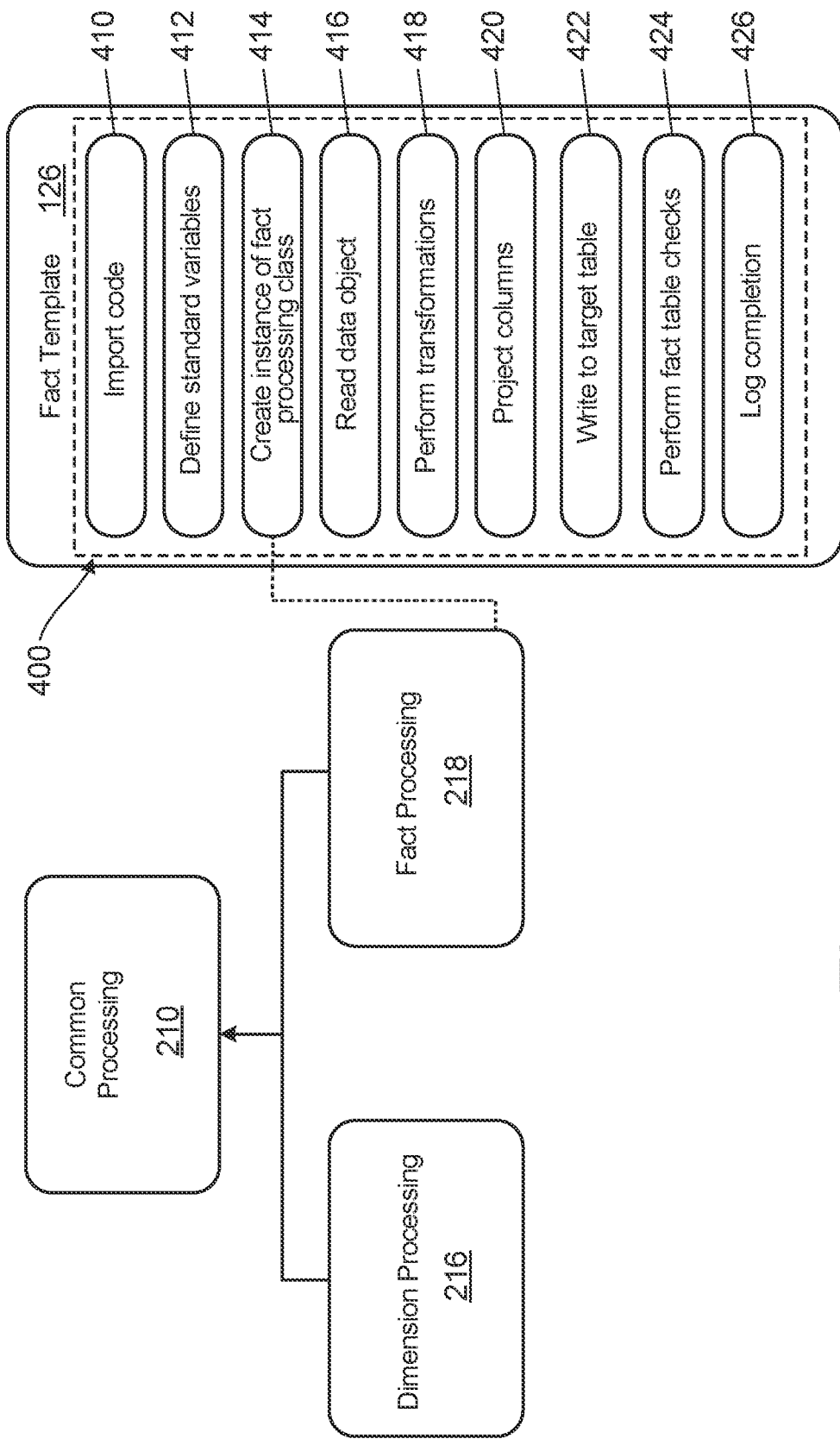
FIG. 4 is a schematic block diagram showing details of an example fact template.
Figure 5:
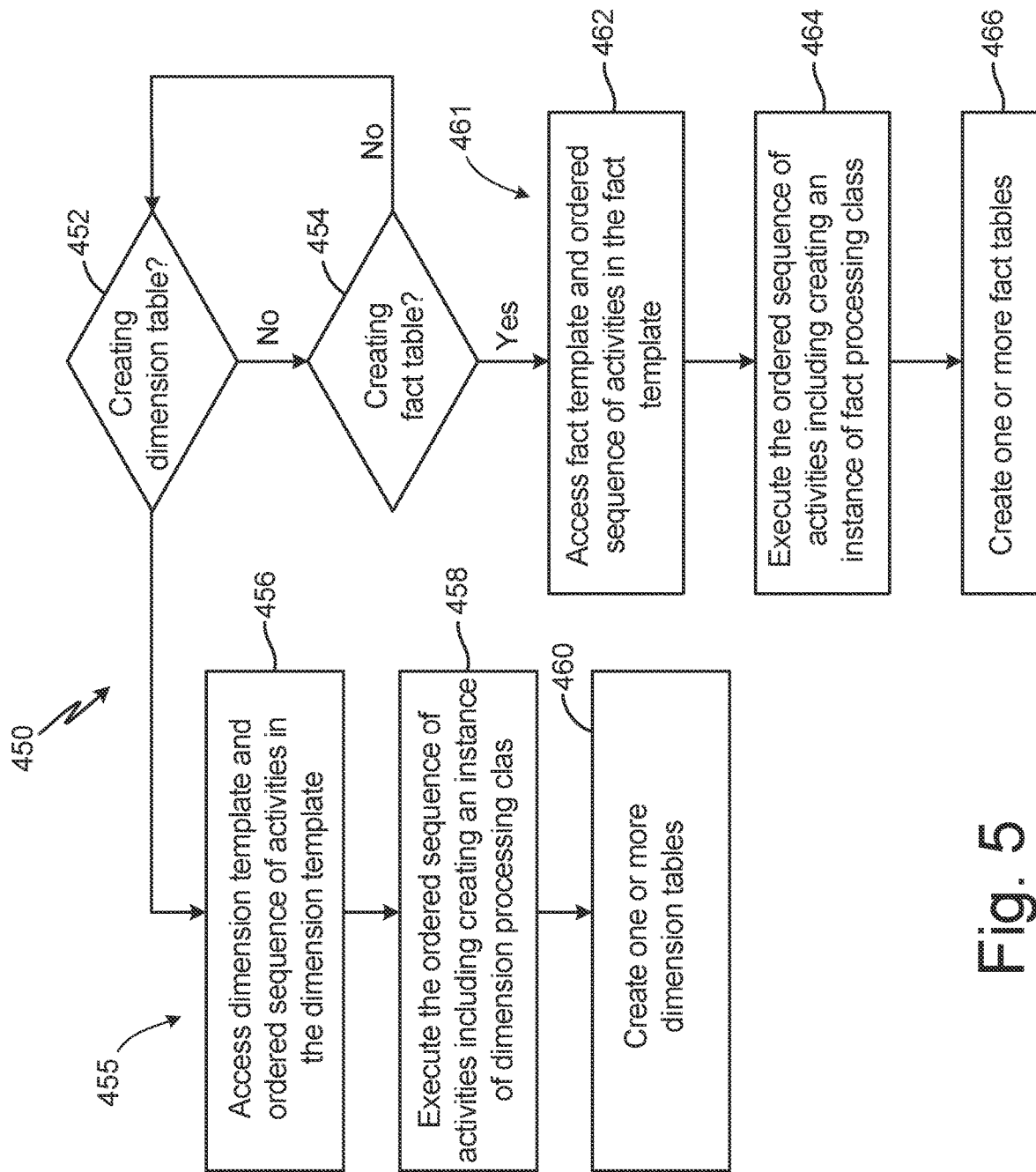
FIG. 5 is a process flowchart illustrating steps of a process for creating dimension or fact tables in the data processing system of FIG. 1.

FIGS. 1-5 will be discussed together. FIG. 1 is a schematic block diagram of data processing system 100 including templates for creating dimension and fact tables. FIG. 2 is a schematic block diagram showing details of class infrastructure 200. FIG. 3 is a schematic block diagram showing details of dimension template 124. FIG. 4 is a schematic block diagram showing details of fact template 126. FIG. 5 is a process flowchart illustrating steps 452-466 of process 450 for creating dimension or fact tables in data processing system 100.

Data processing system 100 is a system for processing electronic data. Data processing system 100 can represent a data pipeline for moving, copying, and/or transforming data from source data store 110 to target data warehouse 114. For example, data processing system 100 can be a system for performing an extract-transform-load (ETL) process or a portion of an ETL process.

As illustrated in FIG. 1, data processing system 100 includes source data store 110, computer 112, target data warehouse 114, and user interface 116. Source data store 110 includes source data objects 118A-118n ("n" is used herein as an arbitrary integer to indicate any number of the referenced component). Computer 112 includes processor 120, memory 122, dimension template 124, fact template 126, and template executor 128. Target data warehouse 114 includes fact table 130 and dimension tables 132.

In general, components of data processing system 100, such as source data store 110, computer 112, and target data warehouse 114, can be remote from each other. For example, source data store 110 can be an "on-premises" data store (e.g., within an organization's data centers) or a "cloud" data store (e.g., available using cloud services from vendors such as Amazon, Microsoft, or Google). Similarly, computer 112 or components of computer 112 can be wholly or partially cloud-based and can be available through a same or different cloud service as source data store 110 in examples where source data store 110 is also cloud-based. Moreover, processing within computer 112 may not be executed in a fixed location, i.e., one or more processes of computer 112 can be executed in different locations (e.g., on different processors). Target data warehouse 114 can also be an on-premises data store or can be cloud-based and available through a same or different cloud service as source data store 110 and/or computer 112 in examples where source data store 110 and/or computer 112 are also cloud-based.

Source data store 110 is a collection of electronic data. Source data store 110 can be a relational, non-relational, or other data storage type. In some examples, source data store 110 can be a data lake or a zone or container defined within a data lake. In other examples, source data store 110 can be any suitable store of electronic data. Although a single source data store 110 is depicted in FIG. 1 for purposes of clarity and ease of discussion, it should be understood that data processing system 100 can include any number of source data stores 110. In examples where there is more than one source data store 110, individual source data stores 110 can be the same type of data store or can be different types of data stores.

Data located in source data store 110 can be in any suitable electronic data format. For example, the data can be structured (e.g., rows and columns in a relational database), unstructured, or semi-structured. In some examples, source data store 110 stores business data, such as employee information, customer information, sales information, financial information, etc., for an organization. In other examples, source data store 110 can store any type of electronic data. In examples where there is more than one source data store 110, individual source data stores 110 can store the same or different types of data.

Source data objects 118A-118n each represent a respective portion of the data located in source data store 110. For example, each of source data objects 118A-118n can be a separate file. In some examples, each of source data objects 118A-118n can be a Parquet file. Although three source data objects 118A-118n are depicted in FIG. 1 for purposes of clarity and ease of discussion, it should be understood that source data store 110 can include any number of source data objects 118A-118n, including more or fewer source data objects 118A-118n.

Computer 112 includes processor 120 and memory 122. Although processor 120 and memory 122 are illustrated in FIG. 1 as being separate components of a single computer device, it should be understood that in other examples, processor 120 and memory 122 can be distributed among multiple connected devices. In yet other examples, memory 122 can be a component of processor 120.

Processor 120 is configured to implement functionality and/or process instructions within data processing system 100. For example, processor 120 can be capable of processing instructions stored in memory 122. Examples of processor 120 can include one or more of a processor, a microprocessor, a controller, a digital signal processor (DSP), an application specific integrated circuit (ASIC), a field-programmable gate array (FPGA), or other equivalent discrete or integrated logic circuitry.

Memory 122 can be configured to store information before, during, and/or after operation of data processing system 100. Memory 122, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 122 can be entirely or partly temporary memory, meaning that a primary purpose of memory 122 is not long-term storage. Memory 122, in some examples, is described as volatile memory, meaning that memory 122 does not maintain stored contents when power to devices (e.g., computer 112) is turned off. Examples of volatile memories can include random access memories (RAM), dynamic random access memories (DRAM), static random access memories (SRAM), and other forms of volatile memories. Memory 122, in some examples, also includes one or more computer-readable storage media. Memory 122 can be configured to store larger amounts of information than volatile memory. Memory 122 can further be configured for long-term storage of information. In some examples, memory 122 includes non-volatile storage elements. Examples of such non-volatile storage elements can include magnetic hard discs, optical discs, flash memories, or forms of electrically programmable memories (EPROM) or electrically erasable and programmable (EEPROM) memories.

Memory 122 is encoded with instructions that are executed by processor 120. For example, memory 122 can be used to store program instructions for execution by template executor 128 on processor 120. In some examples, memory 122 is used by software or applications running on processor 120, e.g., template executor 128, to temporarily store information during program execution.

User interface 116 can be operatively coupled to computer 112 to enable user interaction with computer 112, such as for accessing, configuring, and/or implementing data processing system 100. User interface 116 can include a display device and/or other user interface elements (e.g., keyboard, buttons, monitor, graphical control elements presented at a touch-sensitive display, or other user interface elements). In some examples, user interface 116 includes a graphical user interface (GUI) that includes graphical representations of dimension template 124 and/or fact template 126.

Dimension template 124 and fact template 126 (referred to collectively herein as "templates 124, 126") are files that can contain executable code, visualizations, and narrative text, including comments, examples, or other documentation. In some examples, templates 124, 126 can be in a format that is accessible through a web-based interface (e.g., via user interface 116), such as a Databricks Notebook. More generally, templates 124, 126 can be any suitable format for representing a configuration of code to be executed by processor 120. Templates 124, 126 can support various programming languages, such as Python, Structured Query Language (SQL), etc. Additionally, templates 124, 126 can include interfaces for connecting to various application programming interfaces (APIs). For example, templates 124, 126 can include a PySpark interface for connecting to the Apache Spark data analytics engine.

As will be described in greater detail below with respect to FIG. 2, templates 124, 126 are backed by class infrastructure 200, which is an organization of the code (i.e., methods) for building dimension and fact tables. Templates 124, 126 leverage the code contained in class infrastructure 200 to create dimension and fact tables. More specifically, templates 124, 126 each include several steps—represented as modules in FIGS. 3 and 4—and each step can encompass multiple methods (e.g., as would be represented in one or more lines of code) from class infrastructure 200. In some examples, the code or parts of the code in class infrastructure 200 can be hidden from a user at the template level (e.g., not visible when a user accesses templates 124, 126). Moreover, the functionality that corresponds to each step or module in templates 124, 126 (based on the methods in class infrastructure 200) can be modified in such a way that the change is not visible to a user because additional methods can be added into the underlying class. For example, a method to modify the functionality of creating a dimension table can be added into dimension processing class 216, a method to modify the functionality of creating a fact table can be added into fact processing class 218, a method to modify the functionality of creating both a dimension table and a fact table can be added into common processing class 210, and a method to modify auditing or transformation processing can be added into auditing component 212 or transformation processing component 214 of common processing class 210.

Templates 124, 126 contain an ordered sequence of steps or activities for creating dimension and fact tables, respectively. As will be described in greater detail below with respect to FIGS. 3 and 4, dimension template 124 contains a first ordered sequence of steps for creating dimension tables (FIG. 3) and fact template 126 contains a second ordered sequence of steps for creating fact tables (FIG. 4). The ordered sequence of steps for templates 124, 126 can be standardized steps. Some steps in templates 124, 126 can be preset steps or steps that are not modifiable by a user and require no user input. Other steps can require user input, e.g., in the form of a code statement entered by a user. Steps that require user input are application-specific steps that may differ each time data processing system 100 runs (i.e., each time the steps of dimension template 124 or fact template 126 are executed). For example, a user might specify which source data object 118A-118n will be read. Templates 124, 126 can include indications of sections of the template where the user can input a code statement. The user input can be a code statement in any suitable programming language for dimension template 124 and/or fact template 126, such as Python, SQL, etc. Templates 124, 126 can also include examples of code statements that a user can fill in. More generally, templates 124, 126 can each include any suitable number of steps for guiding the process of creating dimension tables 132 and/or fact table 130. Moreover, the number of steps in templates 124, 126 can be modified such that templates 124, 126 include more or fewer steps or different steps. In some examples, templates 124, 126 can have a same or similar number of steps. In other examples, templates 124, 126 have a different number of steps.

Template executor 128 executes the code that is organized in templates 124, 126. Template executor 128 can be compatible with various programming languages, such as Python, SQL, etc. In some examples, template executor 128 is part of a web-based interface for accessing and running templates 124, 126, such as part of a Databricks Notebook. In such examples, template executor 128 may be initiated from a "run" or similar command that is available to a user. Template executor 128 can execute all the steps of dimension template 124 and/or fact template 126 or can execute individual steps. Further, template executor 128 can be configured to execute the steps of templates 124, 126 based on a trigger, which can include scheduling template executor 128 to run (i.e., execute the steps of dimension template 124 and/or fact template 126) automatically after a defined period elapses or after a trigger event occurs. Trigger events can include, for example, updates to a dataset, such as an update to the data stored in source data store 110.

Target data warehouse 114 is a destination data store for data processed according to the steps of dimension template 124 and/or fact template 126. Target data warehouse 114 can be located remotely from source data store 110. Target data warehouse 114 can be, for example, a data warehouse zone defined within a data lake. In other examples, target data warehouse 114 can be any suitable data store type. Target data warehouse 114 stores fact table 130 and dimension tables 132, which can include transformed data to be used for tasks such as reporting, visualization, analytics, machine learning, etc. One or more users, such as data engineers, data scientists, or any other users, can connect to target data warehouse 114 to access and use data that is stored within target data warehouse 114.

Fact table 130 is created via execution of the steps of fact template 126 by template executor 128. Fact table 130 is a data structure that includes data organized into rows and columns. Fact table 130 contains measurements or metrics (i.e., facts) for an event, such as a business process. For example, fact table 130 can contain information about a business's sales. In other examples, fact table 130 can contain any measurements or metrics. Fact table 130 can be a different type of fact table, such as transactional fact table, a periodic snapshot table, etc., depending on the methods called from fact template 126. Dimension tables 132 are created via execution of the steps of dimension template 124 by template executor 128. Like fact table 130, dimension tables 132 are data structures that include data organized into rows and columns. Dimension tables 132 contain descriptive information or attributes (i.e., dimensions) about the facts in fact table 130. For example, if fact table 130 contains sales information, ones of dimension tables 132 can contain a product type that was sold (product type), which employee who made the sale (employee), and which customer bought the product (customer). In other examples, dimension tables 132 can contain any descriptive information or attributes associated with the facts in fact table 130.

As illustrated in FIG. 1, there can be one or more dimension tables 132 for each fact table 130. Although a single fact table 130 is depicted in FIG. 1 for purposes of clarity and ease of discussion, it should be understood that target data warehouse 114 can include any number of fact tables 130 associated with any number of corresponding dimension tables 132. For example, target data warehouse 114 can include multiple fact tables 130, each having one or more corresponding dimension tables 132. The number of fact tables 130 and corresponding dimension tables 132 can depend on the type of data organized in target data warehouse 114. In the example shown in FIG. 1, the records in fact table 130 are defined by four different dimensions (four dimension tables 132). In another example, the records in fact table 130 can be defined by more or fewer different dimensions (more or fewer dimension tables 132). The overall relationship between fact table 130 and dimension tables 132 in target data warehouse 114 can be represented in a schema of target data warehouse 114, such as a star schema, a snowflake schema, or another type of schema.

Referring now to FIG. 2, class infrastructure 200 includes common processing class 210, including auditing component 212 and transformation processing component 214, dimension processing class 216, and fact processing class 218. Class infrastructure 200 is an organization of code in an object-oriented programming paradigm. Each class represented in class infrastructure 200 is a grouping of code (i.e., methods) that is available to objects instantiated from the respective class. Class infrastructure 200 organizes the code that makes up the steps of dimension template 124 and fact template 126. In some examples, the code in class infrastructure 200 is written in the Python programming language. In other examples, the code in class infrastructure 200 can be written in any suitable programming language for object-oriented programming.

Common processing class 210 is a class within class infrastructure 200. Common processing class 210 is a parent or base class that contains all the code (i.e., methods) that is shared between the processes for creating dimension and fact tables. That is, if a method is used in both dimension template 124 and fact template 126, it can be included in common processing class 210. Common processing class 210 can include methods for defining a full load (loading an entire data object, e.g., one of source data objects 118A-118n) or an incremental load (identifying and loading only any changes or new portions of the data object since the last time the data object was accessed). In some examples, incremental load methods can include hashing functions. It may be desirable to perform an incremental load of dimension template 124 or fact template 126 if there are many records to be read from source data store 110, such as hundreds of thousands, millions, or other amounts.

Common processing class 210 also includes methods for generating and storing information about data origin, lineage, and context (i.e., metadata) within data processing system 100. These methods can be conceptually represented in auditing component 212 and transformation processing component 214 of common processing class 210. Auditing component 212 and transformation processing component 214 can be subsets of common processing class 210. In some examples, auditing component 212 and transformation processing component 214 can be implemented separately from the other methods of class infrastructure 200. Auditing component 212 can include methods to capture information that includes, but is not limited to, an identification of data objects that are read or written in data processing system 100, a number of records (e.g., rows of a table) that are read or written from a respective data object, and a duration of an operation (e.g., a duration of executing one or more or all of the steps of dimension template 124 or fact template 126, such as steps for reading or writing data) within data processing system 100. Auditing component 212 can be implemented by an instance of dimension processing class 216 or fact processing class 218, or can be independently implemented if a user wants to perform auditing functionality separate from creating dimension or fact tables. Similarly, transformation processing component 214 can include methods to capture information that includes, but is not limited to, a description of a transformation processing step (i.e., a data transformation step) within dimension template 124 or fact template 126, a duration of the transformation processing step, and a number of records read or written in the transformation processing step. Transformation processing component 214 can also include methods for recording actual code statements, such as SQL statements, that are entered by a user into modules of templates 124, 126.

Dimension processing class 216 includes methods that are specific to creating dimension tables 132. Accordingly, dimension processing class 216 is instantiated when template executor 128 executes the steps of dimension template 124. Dimension processing class 216 can be considered a child class of common processing class 210 such that an instance of dimension processing class 216 inherits from common processing class 210. That is, dimension processing class 216 can inherit all the functionality of common processing class 210 and include any additional functionality (methods) defined in dimension processing class 216.

Fact processing class 218 includes methods that are specific to creating fact table 130. Accordingly, fact processing class 218 is instantiated when template executor 128 executes the steps of fact template 126. Like dimension processing class 216, fact processing class 218 can be considered a child class of common processing class 210 such that an instance of fact processing class 218 inherits from common processing class 210. That is, fact processing class 218 can inherit all the functionality of common processing class 210 and include any additional functionality (methods) defined in fact processing class 218.

Referring now to FIG. 3, dimension template 124 includes ordered sequence of activities 300 arranged in modules 310-326 for creating dimension tables 132 in target data warehouse 114.

First module 310 represents a first step or set of steps within ordered sequence of activities 300 of dimension template 124. First module 310 includes standard steps for initializing dimension template 124. For example, first module 310 includes a step for importing all the code from class infrastructure 200 so that it is usable by dimension template 124. First module 310 can also include other standard steps, such as setting up any widgets in dimension template 124 (e.g., template view type, etc.), creating an instance of a logger, or any other standard steps for initializing dimension template 124.

Second module 312 represents a second step or set of steps within ordered sequence of activities 300 of dimension template 124. Second module 312 includes a step for defining variables to be used with methods called by dimension template 124. Second module 312 can require user input to define some variables, e.g., to specify an identification of one or more of source data objects 118A-118n (from corresponding source data store 110) from which one or more dimension tables 132 will be created. The variables that require user input are variables that depend on the particular application of dimension template 124. Some variables can be standard (or not require user input), e.g., an identification of target data warehouse 114 where dimension tables 132 will be created, an identification of dimension template 124, a subject area associated with dimension template 124, or any other standard variables that are repeated for each iteration of dimension template 124.

Third module 314 represents a third step or set of steps within ordered sequence of activities 300 of dimension template 124. Third module 314 includes a step for creating an instance of dimension processing class 216 (from class infrastructure 200, as illustrated by the dashed line in FIG. 3).

Fourth module 316 represents a fourth step or set of steps within ordered sequence of activities 300 of dimension template 124. Fourth module 316 includes a step for reading one or more data objects 118A-118n form source data store 110. Reading the one or more data objects 118A-118n can further include copying the one or more data objects 118A-118n. Fourth module 316 can require user input to indicate which of source data objects 118A-118n will be read. Fourth module 316 can also invoke a method (e.g., from auditing component 212 of class infrastructure 200) for logging and storing metadata associated with the one or more data objects 118A-118n that will be read. In this way, data origin and lineage information is preserved because a user indicates which data objects 118A-118n to read, and dimension template 124 is predefined to create a dimension table in target data warehouse 114.

Fifth module 318 represents a fifth step or set of steps within ordered sequence of activities 300 of dimension template 124. Fifth module 318 includes a step for performing transformations on data objects 118A-118n that are read from source data store 110 in the previous step (e.g., at fourth module 316). Fifth module 318 can require user input to indicate desired transformations. For example, the transformations to be performed can be application-specific and dependent on a business logic associated with data processing system 100. Any transformation methods called in fifth module 318 are available from the instance of dimension processing class 216. In some examples, fifth module 318 can include instructions that are visible to a user to identify scenarios when a user might want to choose certain transformations (methods). In some examples, certain transformations can be associated with a type of dimension table to be created. Fifth module 318 can also invoke a method (e.g., from transformation processing component 214 of class infrastructure 200) for logging and storing metadata associated with the transformations that are performed. As will be described in greater detail below with respect to FIGS. 6-8, the method for storing metadata can include storing the actual code statement that is input by a user.

Sixth module 320 represents a sixth step or set of steps within ordered sequence of activities 300 of dimension template 124. Sixth module 320 includes a step for projecting, or identifying, attributes from data objects 118A-118n (ones of data objects 118A-118n that were read from source data store 110 at fourth module 316 and, optionally, transformed at fifth module 318) that will correspond to columns in the target or final dimension table(s) 132. Sixth module 320 can require user input to specify the columns for dimension tables 132 based on the attributes of the respective data objects 118A-118n.

Seventh module 322 represents a seventh step or set of steps within ordered sequence of activities 300 of dimension template 124. Seventh module 322 includes a step for writing data to the target dimension table(s) 132. The data that is written to the target dimension table 132 comes from one or more data objects 118A-118n that were copied from source data store 110 (fourth module 316) and, optionally, transformed (fifth module 318). Seventh module 322 can also invoke a method (e.g., from auditing component 212 of class infrastructure 200) for logging and storing metadata associated with the one or more data objects 118A-118n that will be written to the target dimension table 132.

Eighth module 324 represents an eighth step or set of steps within ordered sequence of activities 300 of dimension template 124. Eighth module 324 includes a step for performing checks to validate the target dimension table(s) 132. In some examples, the checks are standard checks using predefined methods (e.g., from dimension processing class 216). In some examples, the checks can be automatically included in eighth module 324 based on other steps that were performed in ordered sequence of activities 300 of dimension template 124. In other examples, eighth module 324 can include instructions for a user, such as a developer, to perform a review of the code prior to deploying the code to create the target dimension tables 132. Failed checks can indicate that the target dimension table 132 in progress is not yet ready to be deployed to a higher environment (e.g., a production environment). In some examples, dimension template 124 can include alerts for failed checks.

Ninth module 326 represents a tenth (or sequentially last) step or set of steps within ordered sequence of activities 300 of dimension template 124. Accordingly, ninth module 326 represents an end of ordered sequence of activities 300, such that an execution of dimension template 124 terminates after ninth module 326 runs. Ninth module 326 includes a step for logging completion of dimension template 124.

Dimension template 124 can also include any additional steps for creating dimension tables 132. Additional steps can be represented in additional modules, which can be added in any order with respect to modules 310-326. For example, in a healthcare context, dimension template 124 can include or can be modified to include modules with steps for generating an indication or alert that protected health information (PHI) or personal identifiable information (PII) is present in the data object (e.g., based on metadata associated with the data object) and creating a limited view to protect the PHI/PII from unauthorized viewing. In other examples, an additional module can include housekeeping steps or standard data warehousing best practices, such as steps to create a surrogate key to uniquely identify each entity in the dimension table or steps to add an "unknown record" for situations where a fact is properly recorded in the fact table but there is no corresponding record in the dimension table associated with that fact. These steps can be specific to dimension template 124. Moreover, any one or more of modules 310-326 can be combined with each other to include the combination of steps that are represented in the separate modules and preserve ordered sequence of activities 300. Further, some steps or entire modules within dimension template 124 can be optional for a particular application. For example, a user may choose not to perform any data transformations on the data object 118A-118n, so fifth module 318 would not be used. In that case, a user can deactivate (e.g., "comment out") the undesired steps or module so that it is not performed when template executor 128 executes the steps of dimension template 124.

Referring now to FIG. 4, fact template 126 includes ordered sequence of activities 400 arranged in modules 410-426 for creating fact table 130 in target data warehouse 114.

First module 410 represents a first step or set of steps within ordered sequence of activities 400 of fact template 126. First module 410 includes standard steps for initializing fact template 126. For example, first module 410 includes a step for importing all the code from class infrastructure 200 so that it is usable by fact template 126. First module 410 can also include other standard steps, such as setting up any widgets in fact template 126 (e.g., template view type, etc.), creating an instance of a logger, or any other standard steps for initializing fact template 126.

Second module 412 represents a second step or set of steps within ordered sequence of activities 400 of fact template 126. Second module 412 includes a step for defining variables to be used with methods called by fact template 126. Second module 412 can require user inputs to define some variables, e.g., to specify an identification of one or more of source data objects 118A-118n (from corresponding source data store 110) from which one or more fact tables 130 will be created. The variables that require user inputs are variables that depend on the particular application of fact template 126. Some variables can be standard (or not require user inputs), e.g., an identification of target data warehouse 114 where fact table 130 will be created, an identification of fact template 126, a subject area associated with fact template 126, or any other standard variables that are repeated for each iteration of fact template 126.

Third module 414 represents a third step or set of steps within ordered sequence of activities 400 of fact template 126. Third module 414 includes a step for creating an instance of fact processing class 218 (from class infrastructure 200, as illustrated by the dashed line in FIG. 4).

Fourth module 416 represents a fourth step or set of steps within ordered sequence of activities 400 of fact template 126. Fourth module 416 includes a step for reading one or more data objects 118A-118n form source data store 110. Reading the one or more data objects 118A-118n can further include copying the one or more data objects 118A-118n. Fourth module 416 can require user input to indicate which of source data objects 118A-118n will be read. Fourth module 416 can also invoke a method (e.g., from auditing component 212 of class infrastructure 200) for logging and storing metadata associated with the one or more data objects 118A-118n that will be read. In this way, data origin and lineage information is preserved because a user indicates which data objects 118A-118n to read, and fact template 126 is predefined to create a fact table in target data warehouse 114.

Fifth module 418 represents a fifth step or set of steps within ordered sequence of activities 400 of fact template 126. Fifth module 418 includes a step for performing transformations on data objects 118A-118n that are read from source data store 110 in the previous step (e.g., at fourth module 416). Fifth module 418 can require user input to indicate desired transformations. For example, the transformations to be performed can be application-specific and dependent on a business logic associated with data processing system 100. For example, one typical transformation for fact tables is a transformation to replace null values from the data object. In a healthcare example where a patient has not yet seen a provider, target data warehouse 114 could have other information for the patient, but a provider visit date column would reflect a null value, so the data could be transformed to replace the visit date null values with, e.g., "–1." Any transformation methods called in fifth module 418 are available from the instance of fact processing class 218. In some examples, fifth module 418 can include instructions that are visible to a user to identify scenarios when a user might want to choose certain transformations (methods). In some examples, certain transformations can be associated with a type of fact table to be created. Fifth module 418 can also invoke a method (e.g., from transformation processing component 214 of class infrastructure 200) for logging and storing metadata associated with the transformations that are performed. As will be described in greater detail below with respect to FIGS. 6-8, the method for storing metadata can include storing the actual code statement that is input by a user. Based on the chosen data transformations, fifth module 418 can include a method for establishing a final schema for target data warehouse 114.

Sixth module 420 represents a sixth step or set of steps within ordered sequence of activities 400 of fact template 126. Sixth module 420 includes a step for projecting, or identifying, attributes from data objects 118A-118n (ones of data objects 118A-118n that were read from source data store 110 at fourth module 416 and, optionally, transformed at fifth module 418) that will correspond to columns in the target or final fact table(s) 130. Sixth module 420 can require user input to specify the columns for fact table 130 based on the attributes of the respective data objects 118A-118n.

Seventh module 422 represents a seventh step or set of steps within ordered sequence of activities 400 of fact template 126. Seventh module 422 includes a step for writing data to the target fact table(s) 130. The data that is written to the target fact table 130 comes from one or more data objects 118A-118n that were copied from source data store 110 (fourth module 416) and, optionally, transformed (fifth module 418). Seventh module 422 can also invoke a method (e.g., from auditing component 212 of class infrastructure 200) for logging and storing metadata associated with the one or more data objects 118A-118n that will be written to the target fact table 130.

Eighth module 424 represents a eighth step or set of steps within ordered sequence of activities 400 of fact template 126. Eighth module 424 includes a step for performing checks to validate the target fact table(s) 130. In some examples, the checks are standard checks using predefined methods (e.g., from fact processing class 218). In some examples, the checks can be automatically included in eighth module 424 based on other steps that were performed in ordered sequence of activities 400 of fact template 126. For example, if data objects 118A-118n include null values, there can be an automatic check in eighth module 424 to determine if a transformation was performed at fifth module 416 to replace the null values. In other examples, eighth module 424 can include instructions for a user, such as a developer, to perform a review of the code prior to deploying the code to create the target fact tables 130. Failed checks can indicate that the target fact table 130 in progress is not yet ready to be deployed to a higher environment (e.g., a production environment). In some examples, fact template 126 can include alerts for failed checks.

Ninth module 426 represents a ninth (or sequentially last) step or set of steps within ordered sequence of activities 400 of fact template 126. Accordingly, ninth module 426 represents an end of ordered sequence of activities 400, such that an execution of fact template 126 terminates after ninth module 426 runs. Ninth module 426 includes a step for logging completion of fact template 126.

Fact template 126 can also include any additional steps for creating fact tables 130. Additional steps can be represented in additional modules, which can be added in any order with respect to modules 410-426. For example, in a healthcare context, fact template 126 can include or can be modified to include modules with steps for generating an indication or alert that protected health information (PHI) or personal identifiable information (PII) is present in the data object and creating a limited view to protect the PHI/PII from unauthorized viewing. In other examples, because creating fact tables 130 may be one of the final steps of building target data warehouse 114, a developer may want to perform additional validation tests after projecting the columns (sixth module 420), so an additional module can include a step for creating an extra process view frame to allow the developer to perform these tests before deploying the code. Moreover, any one or more of modules 410-426 can be combined with each other to include the combination of steps that are represented in the separate modules and preserve ordered sequence of activities 400. Further, some steps or entire modules within fact template 126 can be optional for a particular application. For example, a user may choose not to perform any data transformations on the data object 118A-118n, so fifth module 418 would not be used. In that case, a user can deactivate (e.g., "comment out") the undesired steps or module so that it is not performed when template executor 128 executes the steps of fact template 126.

The operation of data processing system 100 will be described with reference to FIGS. 1-5. In operation, a user, such as a developer, a data engineer, etc., can access dimension template 124, and corresponding ordered sequence of activities 300, and/or fact template 126, and corresponding ordered sequence of activities 400, from computer 112 via user interface 116. As illustrated in FIG. 5, a first set of decisions in process 450 can be a decision to create a dimension table (decision block 452) or a decision to create a fact table (decision block 454). If a dimension table will be created (YES at block 452), then process 450 proceeds down first sequence of steps 455. If a dimension table will not be created (NO at block 452) but a fact table will be created (YES at block 454), then process 450 proceeds down second sequence of steps 461. At step 456 of first sequence of steps 455, dimension template 124 and corresponding ordered sequence of activities 300 are accessed. Alternatively, at step 462 of second sequence of steps 461, fact template 126 and corresponding ordered sequence of activities 400 are accessed.

After accessing dimension template 124 or fact template 126, a user can view the template steps, view any comments or examples included with the steps, input user code, and run the respective template steps to create a dimension or fact table. The user can input a code statement into steps or modules of dimension template 124 and/or fact template 126 that require user input (e.g., modules 312, 316, 318, and 320 for dimension template 124 and modules 412, 416, 418 and 420 for fact template 126) to specify application-specific parts of the process. In some examples, a user can remove or deactivate one or more modules in dimension template 124 and/or fact template 126 if desired for the user's particular application.

The user can direct template executor 128 to execute ordered sequence of activities 300 of dimension template 124 (step 458 in FIG. 5) or ordered sequence of activities 400 of fact template 126 (step 464 in FIG. 5), e.g., by entering a command or performing a corresponding action, or template executor 128 can execute the steps of dimension template 124 or fact template 126 automatically based on a triggering event. Template executor 128 executes the selected one of dimension template 124 and fact template 126. One or more dimension tables 132 are created from an execution (or run) of dimension template 124 (step 460 in FIG. 5), wherein data is read from one or more data objects 118A-118n, processed and transformed according to the methods in dimension template 124, and written to target data warehouse 114. In other words, one or more dimension tables 132 can be created when template executor 128 creates an instance of dimension processing class 216 because dimension processing class 216 contains the methods called in dimension template 124 that are dimension table-specific. One or more fact tables 130 are created from an execution (or run) of fact template 126 (step 466 in FIG. 5), wherein data is read from one or more data objects 118A-118n, processed and transformed according to the methods in fact template 126, and written to target data warehouse 114. In other words, one or more fact tables 130 can be created when template executor 128 creates an instance of fact processing class 218 because fact processing class 218 contains the methods called in fact template 126 that are fact table-specific.

In the overall development lifecycle for a data warehouse, a significant portion of the time is spent building dimension and fact tables. Typically, dimension and fact tables are built from scratch for each project, and there may be very little guidance available to developers, who will each have their own way of writing code. The traditional process of building dimension and fact tables for a data warehouse is therefore relatively unstructured. According to techniques of this disclosure, templates 124, 126 leveraging class infrastructure 200 can accelerate creation of dimension and fact tables by providing more guidance to developers. Building a hand-crafted data warehouse for each application can take many weeks or months. In contrast, data processing system 100, including templates 124, 126 that leverage class infrastructure 200 can build the main components of a data warehouse (dimension tables 132 and fact table 130) in a much shorter time, such as days or weeks.

Templates 124, 126 not only reduce the amount of time required to build dimension and fact tables but also include other supporting code (e.g., data warehousing best practices, integrated metadata generation and storage, etc.) to bring the data warehouse deliverable up to a higher standard. Templates 124, 126 minimize the work a developer must do to produce high quality data warehouse 114 by guiding the developer through the steps for building dimension and fact tables. This guidance can be especially important if business clients eventually want to take over managing data processing system 100.

At the same time, class infrastructure 200 can include a library of methods for building various types of dimension and fact tables with different requirements, so templates 124, 126 can be highly flexible. For a hand-crafted build process, a developer might only have time to include the minimum necessary code for the particular build. However, class infrastructure 200 is a way of making any methods that could be used for building dimension and fact tables available to a user. Class infrastructure 200 with common processing class 210 separate from dimension processing class 216 and fact processing class 218 enables methods corresponding to each process (i.e., building dimension and fact tables, respectively) to be logically organized. Common processing class 210 provides a means for efficiently managing parts of each process that overlap or are shared. Additionally, the template format of templates 124, 126 that leverage class infrastructure 200 enables a developer to easily modify or evolve the process of building dimension and fact tables by adding or removing methods from a corresponding class in class infrastructure 200 without making significant changes to templates 124, 126. That is, to some extent, changes to methods in class infrastructure 200 that affect the functionality of templates 124, 126 can be hidden from users at the template level. In this way, using templates 124, 126 can be a simpler process for building dimension and fact tables than hand-crafted processes that can require directly interacting with large blocks of relatively unorganized code.

Integrated Metadata Generation and Storage in Metadata-Based Data Processing System According to techniques of this disclosure, a metadata-based data processing system includes integrated metadata-gathering to build a metadata data store that stores process definition metadata correlated with runtime metadata. The metadata data store is more robust and enables more insight into the processes carried out in the data processing system than traditional data cataloging options because the metadata data store automatically stores actual runtime metadata from the process, in addition to other metadata, such as record counts, date, time, etc. The data processing system disclosed herein, including integrated metadata-gathering, and corresponding methods are described below with reference to FIGS. 6-8.

Figure 6:
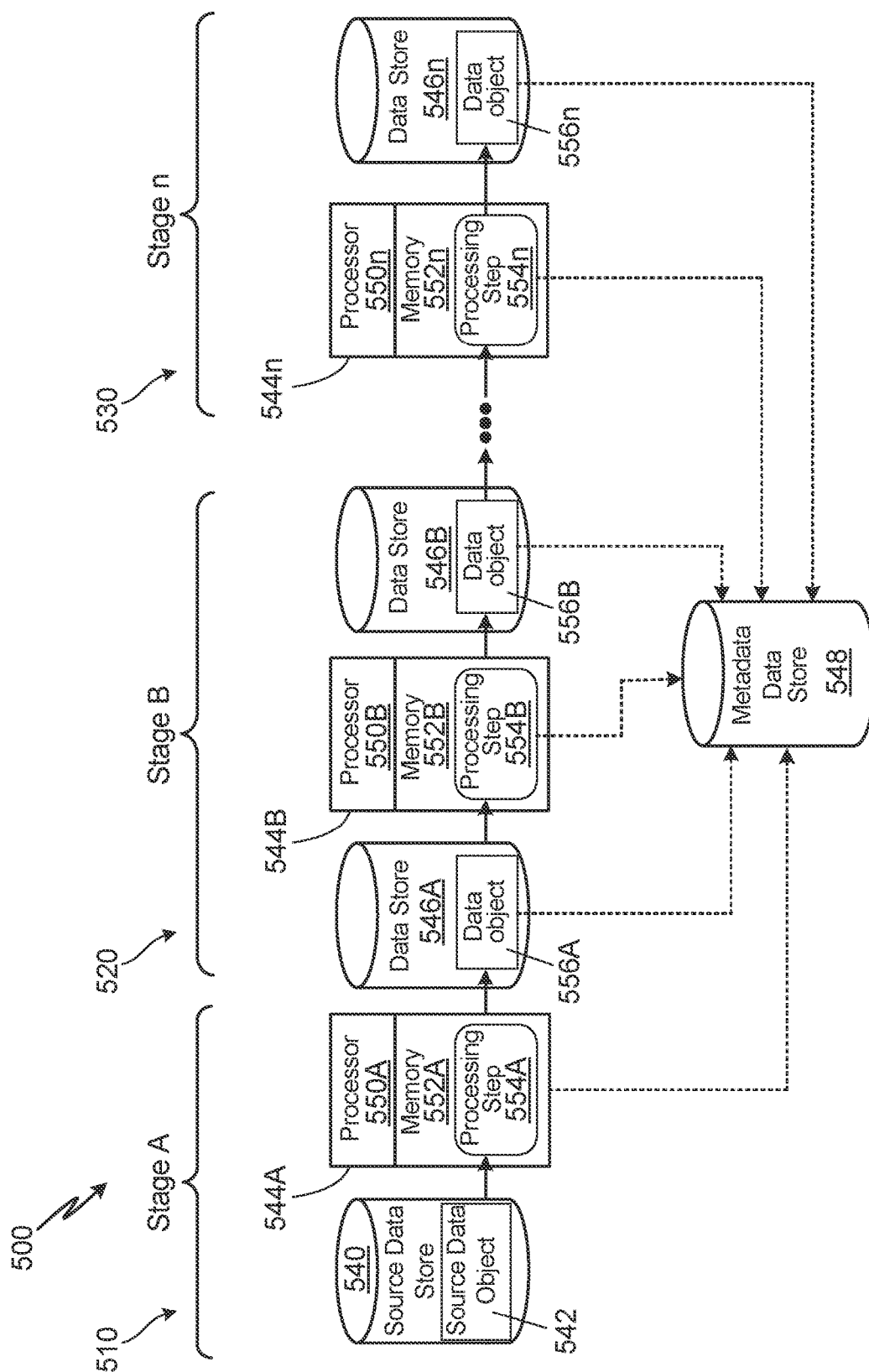
FIG. 6 is a schematic block diagram of a data processing system for generating and storing metadata.
Figure 7:
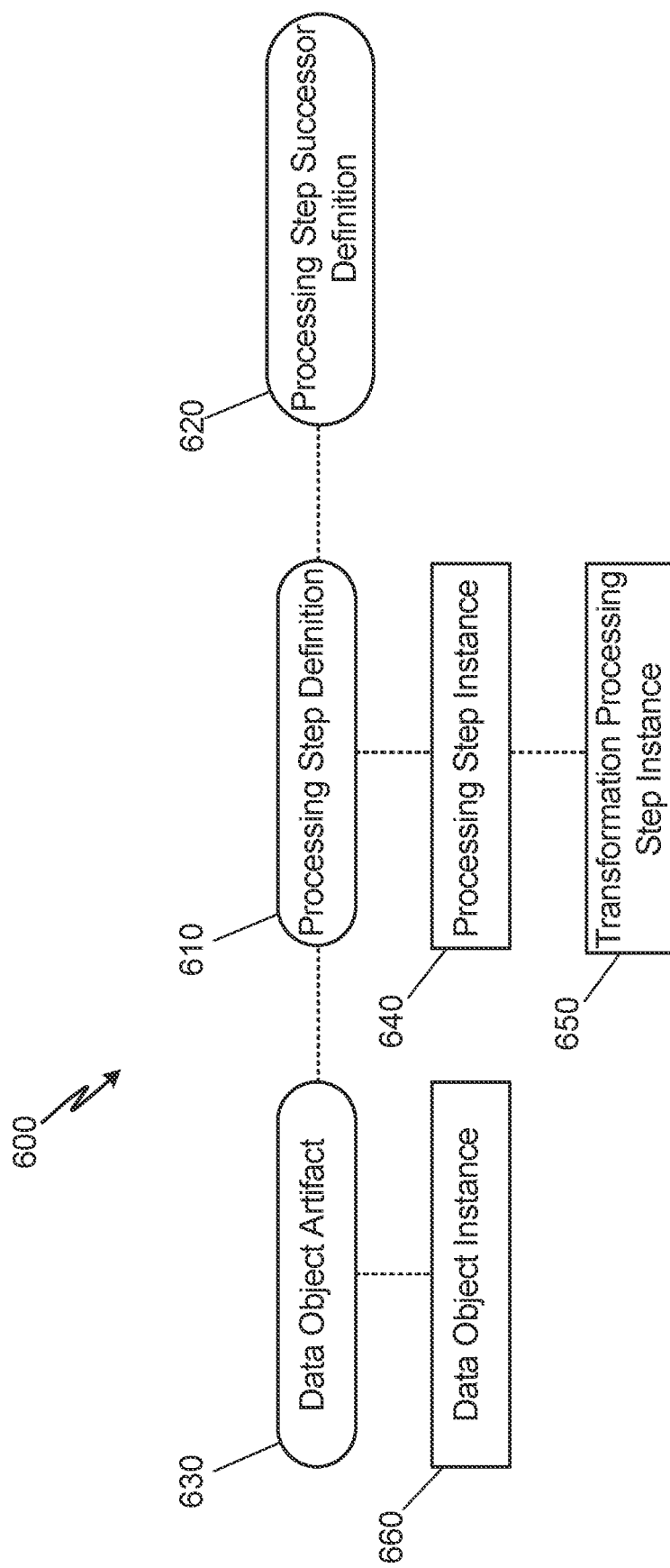
FIG. 7 is a schematic block diagram of an example schema for organizing metadata in the data processing system of FIG. 6.
Figure 8:
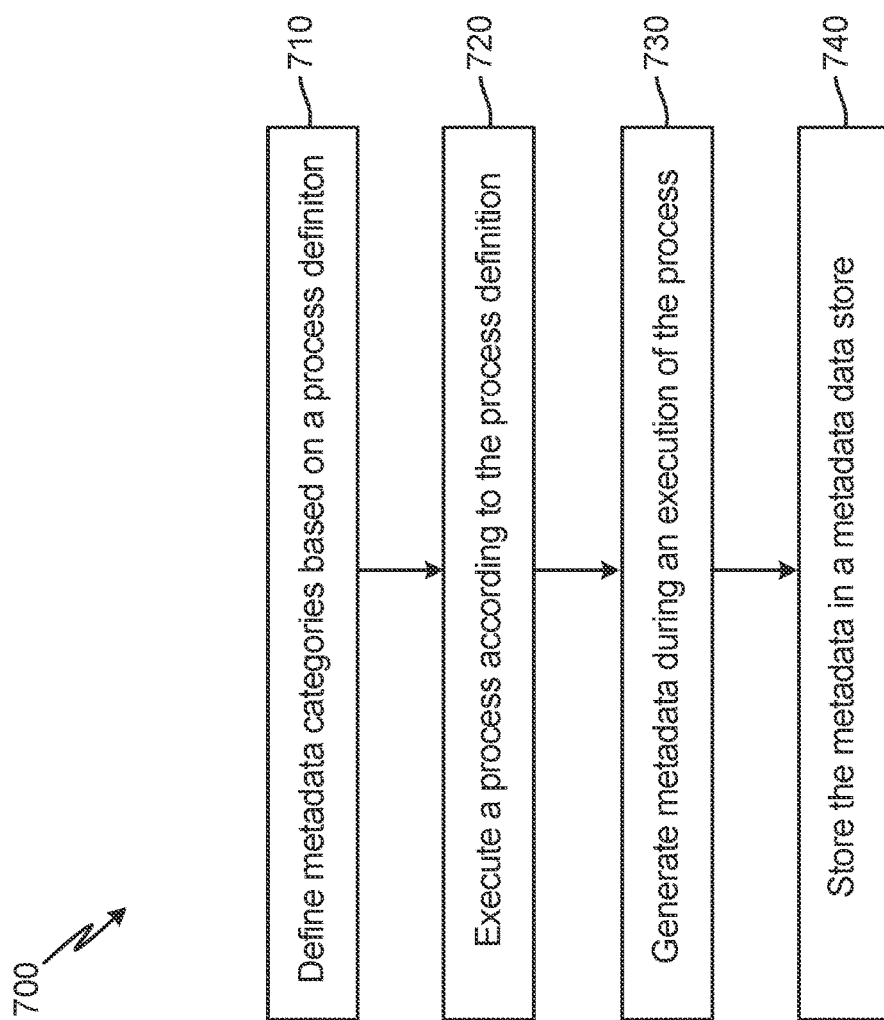
FIG. 8 is a process flowchart illustrating steps of a process for generating and storing metadata in the data processing system of FIG. 6.

FIGS. 6-8 will be discussed together. FIG. 6 is a schematic block diagram of data processing system 500 for generating and storing metadata. FIG. 7 is a schematic block diagram of schema 600 for organizing metadata in data processing system 500. FIG. 8 is a process flowchart illustrating steps 710-740 of process 700 for generating and storing metadata in data processing system 500.

As illustrated in FIG. 6, data processing system 500 includes first stage 510, intermediate stage 520, final stage 530, source data store 540, source data object 542, computers 544A-544n, sequential data stores 546A-546n, and metadata data store 548. Each of computers 544A-544n includes a corresponding processor 550A-550n, memory 552A-552n, and processing step 554A-554n. Each of sequential data stores 546A-546n includes a corresponding data object 556A-556n. As illustrated in FIG. 7, schema 600 includes processing step definition block 610, processing step successor definition block 620, data object artifact block 630, processing step instance block 640, transformation processing step instance block 650, and data object instance 660.

Data processing system 500 is a system for processing electronic data. Data processing system 500 can represent a data pipeline or pipelines for moving, copying, and/or transforming data from source data store 540 through sequential data stores 546A-546n. For example, data processing system 500 can be a system for performing an extract-transform-load (ETL) process. In some examples, data processing system 500 can be an enterprise-level system for integrating data for business intelligence (BI) initiatives.

Data processing system 500 has a corresponding process definition, or order of data pipelines or processing steps, that is encapsulated in metadata (i.e., process definition metadata). Accordingly, data processing system 500 is a metadata-based system. The process definition of data processing system 500 encompasses a sequence of processing steps 554A-554n and respective data stores (source data store 540 and sequential data stores 546A-546n) from which data objects 542, 554A-554n are produced or consumed. In other words, the process definition is effectively a configuration of data processing system 500. The process definition of data processing system 500 can be defined or stored such that it is accessible in the compute environment for data processing system 500 (e.g., stored in memory 552A-552n and accessible by processors 550A-550n).

Data processing system 500 (and its corresponding process definition) can be divided into one or more stages. As illustrated in FIG. 6, data processing system 500 includes first stage 510 (Stage A), intermediate stage 520 (Stage B), and final stage 530 (Stage n). Although FIG. 6 depicts a single intermediate stage 520 for purposes of clarity and ease of discussion, other examples of data processing system 500 can include any number of intermediate stages 520 (which could be represented, e.g., as intermediate stages 520A-520n in sequential order). Moreover, the example shown in FIG. 6 includes three sequential stages (first stage 510, intermediate stage 520, and final stage 530), but it should be understood that other examples can include more or fewer stages. One such example of a data processing system could consist of only first stage 510. Another example could consist of first stage 510 and final stage 530. Yet other examples could consist of first stage 510, multiple intermediate stages 520, and final stage 530.

First stage 510 represents a portion of data processing system 500 (i.e., a first data pipeline) for copying, moving, and/or transforming data from source data store 540 to sequential data store 546A. Intermediate stage 520 represents a portion of data processing system 500 (i.e., a second data pipeline) for copying, moving, and/or transforming data from sequential data store 546A to sequential data store 546B. Final stage 530 represents a portion of data processing system 500 (i.e., a third data pipeline) for copying, moving, and/or transforming data to sequential data store 546n from a sequentially previous data store 546 (e.g., sequential data store 546B in the example shown in FIG. 6). In some examples, first stage 510 can be an embodiment of a data ingestion process according to U.S. patent application Ser. No. 17/670,896, entitled "SCALABLE METADATA-DRIVEN DATA INGESTION PIPELINE" and filed on Feb. 14, 2022, which is hereby incorporated by reference in its entirety. Each intermediate stage 520 (i.e., portions of data processing system 500 from one sequential data store 546A-546n to the sequentially next or subsequent data store 546A-546n, e.g., from data store 546A to data store 546B) can represent various other processes or processing steps that may be implemented in an ETL process, including data cleansing steps, quality control steps, data transformations, etc. In some examples, final stage 530 can be an embodiment of data processing system 100 as described above with respect to FIGS. 1-5, such that sequentially last data store 546n can be an embodiment of target data warehouse 114 (FIG. 1).

In general, components of data processing system 500, such as source data store 540, computers 544A-544n, sequential data stores 546A-546n, and metadata data store 548 can be remote from each other. For example, source data store 540 can be an "on-premises" data store (e.g., within an organization's data centers) or a "cloud" data store (e.g., available using cloud services from vendors such as Amazon, Microsoft, or Google). Similarly, each of computers 544A-544n or components of computers 544A-544n can be wholly or partially cloud-based and can be available through a same or different cloud service as source data store 540 in examples where source data store 540 is also cloud-based. Moreover, processing steps 554A-554n of computers 544A-544n may not be executed in a fixed location, i.e., processing steps 554A-554n can be executed in different locations (e.g., on different processors). Sequential data stores 546A-546n and metadata data store 548 can also be on-premises data stores or can be cloud-based and available through a same or different cloud service as source data store 540 and/or computers 544A-544n in examples where source data store 540 and/or computers 544A-544n are also cloud-based.

Source data store 540 is a collection of electronic data. Source data store 540 can be a relational, non-relational, or other data storage type. In some examples, source data store 540 can be a database, such as an Oracle database, an Azure SQL database, or any other type of database. In some examples, source data store 540 can be a data lake or a zone or container defined within a data lake. In other examples, source data store 540 can be a SharePoint list or flat file type, such as an Excel spreadsheet. In yet other examples, source data store 540 can be any suitable store of electronic data. Although a single source data store 540 is depicted in FIG. 6 for purposes of clarity and ease of discussion, it should be understood that data processing system 500 can include any number of source data stores 540. System 500 can, in principle, include a large and scalable number of source data stores 540. In examples where there is more than one source data store 540, individual source data stores 540 can be the same type of data store or can be different types of data stores.

Data located in source data store 540 can be in any suitable electronic data format. For example, the data can be structured (e.g., rows and columns in a relational database), unstructured, or semi-structured. In some examples, source data store 540 stores business data, such as employee information, customer information, sales information, financial information, etc., for an organization. In other examples, source data store 540 can store any type of electronic data. In examples where there is more than one source data store 540, individual source data stores 540 can store the same or different types of data.

Source data object 542 represents all or a portion of the data located in source data store 540. For example, source data object 542 can be a file. In some examples, source data object 542 can be a Parquet file. Although a single source data object 542 is depicted in FIG. 6 for purposes of clarity and ease of discussion, it should be understood that source data store 540 can include any number of source data objects 542, including multiple source data objects 542.

Computers 544A-544n include corresponding processors 550A-550n and memory 552A-552n. Although each of processors 550A-550n and corresponding memory 552A-552n are illustrated in FIG. 6 as being separate components of a corresponding computer device (e.g., computer 544A includes processor 550A and memory 552A), it should be understood that in other examples, each of processors 550A-550n and corresponding memory 552A-552n can be distributed among multiple connected devices. In yet other examples, memory 552A-552n can be a component of corresponding processor 550A-550n. In yet other examples, computers 544A-544n can be a single computer device that includes all the functionality of processors 550A-550n and memory 552A-552n, such that, e.g., processing steps 554A-554n are all carried out by the same computer.

Processors 550A-550n are configured to implement functionality and/or process instructions within data processing system 500. For example, processors 550A-550n can be capable of processing instructions stored in memory 552A-552n. Examples of processors 550A-550n can include one or more of a processor, a microprocessor, a controller, a digital signal processor (DSP), an application specific integrated circuit (ASIC), a field-programmable gate array (FPGA), or other equivalent discrete or integrated logic circuitry.

Memory 552A-552n can be configured to store information before, during, and/or after operation of data processing system 500. Memory 552A-552n, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 552A-552n can be entirely or partly temporary memory, meaning that a primary purpose of memory 552A-552n is not long-term storage. Memory 552A-552n, in some examples, is described as volatile memory, meaning that memory 552A-552n does not maintain stored contents when power to devices (e.g., computers 544A-544n) is turned off. Examples of volatile memories can include random access memories (RAM), dynamic random access memories (DRAM), static random access memories (SRAM), and other forms of volatile memories. Memory 552A-552n, in some examples, also includes one or more computer-readable storage media. Memory 552A-552n can be configured to store larger amounts of information than volatile memory. Memory 552A-552n can further be configured for long-term storage of information. In some examples, memory 552A-552n includes non-volatile storage elements. Examples of such non-volatile storage elements can include magnetic hard discs, optical discs, flash memories, or forms of electrically programmable memories (EPROM) or electrically erasable and programmable (EEPROM) memories.

Memory 552A-552n is encoded with instructions that are executed by corresponding processors 550A-550n. For example, memory 552A-552n can be used to store program instructions for execution of processing steps 554A-554n on processors 550A-550n. In some examples, memory 552A-552n is used by software or applications running on processors 550A-550n, e.g., processing steps 554A-554n, to temporarily store information during program execution.

Processing steps 554A-554n are each a set of code for processing data objects 542, 556A-556n. For example, processing steps 554A-554n can be a copy activity or sequence of activities in Azure Data Factory (ADF) (i.e., an ADF pipeline), a Databricks Notebook, another program, etc. In an example where sequentially last data store 546n is an embodiment of target data warehouse 114 (FIG. 1), processing step 554n can represent either dimension template 124 or fact template 1216 (FIG. 1).

Processing steps 554A-554n are each defined by a corresponding processing step definition (block 610 in FIG. 7), which represents a set or category of metadata associated with processing steps 554A-554n. Processing step definitions are a first set of process definition metadata that corresponds to processing steps 554A-554n in the process definition of data processing system 500. Processing step definition metadata can include an indication of the type of processing step for each processing steps 554A-554n. Processing step definition metadata can also include or reference a subject area for classifying processing steps 554A-554n and a stage within data processing system 500 (e.g., first stage 510, intermediate stage 520, final stage 530) that is associated with respective processing steps 554A-554n. For example, these attributes can be predefined based on the process definition. The code associated with each processing step 554A-554n can include a method for automatically populating records (e.g., rows) into the processing step definition metadata set (e.g., table) in metadata data store 548. Accordingly, one part of runtime metadata generated and stored by data processing system 500 is the records populated into the first process definition metadata set for processing step definition metadata.

Processing steps 554A-554n are also executed, which results in instances of processing steps 554A-554n. There is a set or category of instance metadata associated with each processing step instance (block 640 in FIG. 7). Processing step instance metadata can include an identification of a run (an instance) of each processing step 554A-554n, a date or time of the run, a duration of the run, or other metadata. The code associated with each processing step 554A-554n can include a method for automatically storing the processing step instance metadata in metadata data store 548. Accordingly, another part of the runtime metadata generated and stored by data processing system 500 is the processing step instance metadata. In some examples, the processing step instance metadata can be linked or correlated to a corresponding record in the processing step definition metadata table.

Each of processing steps 554A-554n can be succeeded by another one of processing steps 554A-554n (i.e., a processing step successor). For example, as illustrated in FIG. 6, processing step 554A can be succeeded by processing step 554B. Processing step successors are each defined by a corresponding processing step successor definition (block 620 in FIG. 7), which represents a set or category of metadata associated with processing step successors. Processing step successor definitions are a second set of process definition metadata that corresponds to processing step successors in the process definition of data processing system 500. Processing step successor definition metadata can include or capture the relationship between each of processing steps 554A-554n and a corresponding successor. That is, processing step successor definition metadata indicates which of processing steps 554A-554n preceded the processing step successor. In some examples, processing step definition metadata can create an execution graph or processing spectrum of the sequence or organization of processing steps 554A-554n (processing step and processing step successor) in data processing system 500. For example, these attributes can be predefined based on the process definition. The code associated with each processing step 554A-554n can include a method for automatically populating records (e.g., rows) into the processing step successor definition metadata set (e.g., table) in metadata data store 548. Accordingly, another part of the runtime metadata generated and stored by data processing system 500 is the records populated into the second process definition metadata set for processing step successor definition metadata Each of processing steps 554A-554n can also include one or more data transformations (i.e., transformation processing steps). Transformation processing steps are executed as processing steps 554A-554n are executed, which results in instances of the transformation processing steps. There is a set or category of instance metadata associated with each transformation processing step instance (block 650 in FIG. 7). Transformation processing step instance metadata can include an identification of a run (an instance) of an individual transformation step within one of processing steps 554A-554n, a date or time of the run, a duration of the run, a record count of records operated on in the transformation step, an indication of operations performed in the transformation step, a log of an actual code statement associated with the transformation step (e.g., as input by a user), or other metadata. The code associated with each processing step 554A-554n can include a method for automatically storing the transformation processing step instance metadata in metadata data store 548. Accordingly, another part of the runtime metadata generated and stored by data processing system 500 is the transformation processing step instance metadata. In some examples, this metadata can be linked or correlated to a corresponding record in the processing step definition or processing step instance metadata tables.

In an example where processing step 554n is either dimension template 124 or fact template 126 (FIG. 1), transformation processing steps can be any one or more transformations performed in, e.g., corresponding fifth module 316, 416 or another module. In particular, the transformation processing steps can correspond to ones of modules 310-326 for dimension template 124 or modules 410-426 for fact template 126 where a user input code statement is entered. In some examples, templates 124, 126 can include an instruction to a user to call a method for storing the transformation processing step instance metadata associated with the transformation that was performed. In some examples, this instruction may be included if a particular transformation is generally more complex than other steps in the template. In general, there may not be separate definition metadata (e.g., based on the process definition of data processing system 500) associated with any transformation processing steps because the transformations that are executed in processing steps 554A-554n can be application-specific (i.e., can depend on the business logic for a particular application).

Sequential data stores 546A-546n are destination data stores for data processed via a preceding one of processing steps 554A-554n. Sequential data stores 546A-546n can be located remotely from source data store 540. Each of sequential data stores 546A-546n can be, for example, a data warehouse zone defined within a data lake. That is, each of sequential data stores 546A-546n can be a different zone or container within a data lake that is accessed during a different portion of an ETL process (e.g., a different stage 510, 520, 530 of data processing system 500). In other examples, sequential data stores 546A-546n can be any suitable data store type. Sequential data stores 546A-546n store corresponding data objects 556A-556n (e.g., sequential data store 546A stores data object 556A, etc.), including transformed data to be used for tasks such as reporting, visualization, analytics, machine learning, etc.

Data located in sequential data stores 546A-546n can be in any suitable electronic data format. For example, the data can be structured (e.g., rows and columns in a relational database), unstructured, or semi-structured. In some examples, sequential data stores 546A-546n store business data, such as employee information, customer information, sales information, financial information, etc., for an organization. In other examples, sequential data stores 546A-546n can store any type of electronic data. Individual ones of sequential data stores 546A-546n can store the same or different types of data.

Data objects 556A-556n are data objects stored in a corresponding one of sequential data stores 546A-546n (e.g., data object 556A is stored in sequential data store 546A, etc.). Data objects 556A-556n represent all or a portion of the data located in the respective sequential data store 546A-546n. For example, data objects 556A-556n can be files. In some examples, data objects 556A-556n can be Parquet files. Although a single data object 556A-556n is depicted within each corresponding data store 546A-546n in FIG. 6 for purposes of clarity and ease of discussion, it should be understood that each data store 546A-546n can include any number of corresponding data objects 556A-556n, including multiple corresponding data objects 556A-556n.

Data objects 556A-556n can be consumed (or read) by one or more of processing steps 554A-554n. In the example shown in FIG. 6, source data object 542 is read by processing step 554A, data object 556A is read by processing step 554B, and data object 556B is read by a sequentially next processing step (e.g., processing step 554n in FIG. 6). Data objects 556A-556n can also be produced (or written) by one of processing steps 554A-554n. In the example shown in FIG. 6, data object 556A is produced by processing step 554A, data object 556B is produced by processing step 554B, and data object 556n is produced by a sequentially previous processing step (e.g., processing step 554n in FIG. 6).

Data objects 556A-556n are each defined by a corresponding data object artifact (block 630 in FIG. 7), which represents a set or category of metadata associated data objects 556A-556n. Data object artifacts are a third set of process definition metadata that corresponds to data objects 556A-556n in the process definition of data processing system 500. Data object artifact metadata can include an indication of the type of data object (e.g., Parquet file, Hive table, etc.) for each of data objects 556A-556n, an identification of the one of processing steps 554A-554n that produced or consumed each of data objects 556A-556n, and record count thresholds for records read or written from data objects 556A-556n. For example, these attributes can be predefined based on the process definition. In some examples, record count thresholds are preset. In some examples, preset thresholds include a minimum record count (such as at least one record) and/or a maximum record count. In other examples, record count thresholds can be manually set or refined for particular data object types. If record counts are outside the thresholds, data processing system 500 can still proceed (e.g., for data governance purposes) but can generate an alert to indicate a deviation with respect to the threshold. In some examples, the alert can direct a user to a code statement that is associated with an operation (e.g., a transformation) in the respective processing step 554A-554n for reading or writing the records. The code associated with each processing step 554A-554n that produces or consumes data objects 556A-556n can include a method for automatically populating records (e.g., rows) into the data object artifact metadata set (e.g., table) in metadata data store 548. Accordingly, another part of the runtime metadata generated and stored by data processing system 500 is the records populated into the third process definition metadata set for data object artifact metadata.

Processing data objects 556A-556n by a corresponding processing step 554A-554n results in an instance of the processed data object 556A-556n. Processing data objects 556A-556n by a corresponding processing step 554A-554n includes performing an operation on the respective data object 556A-556n, such as consuming (reading) or producing (writing) the respective data object 556A-556n. The instances of each data object 556A-556n are actual data structures such as files that are read or written. Accordingly, each data object instance can have a type or file type that is represented by the corresponding data object artifact record. For each data object artifact associated with one of data objects 556A-556n, there can be multiple data object instances because data objects 556A-556n can be read and written multiple times by operation of data processing system 500. There is a set or category of instance metadata associated with each data object instance (block 660 in FIG. 7). Data object instance metadata can include an identification of an instance of one of data objects 556A-556n, a date or time that the data object instance was read or written, a duration of the operation (reading or writing), a record count of records that were read or written, an indication of the operation performed (reading or writing), or other metadata. The code associated with each processing step 554A-554n that produces or consumes data objects 556A-556n can include a method for automatically storing the data object instance metadata in metadata data store 548. Accordingly, another part of the runtime metadata generated and stored by data processing system 500 is the data object instance metadata. In some examples, this metadata can be linked or correlated to a corresponding record in the data object artifact metadata table.

Metadata data store 548 is a data store for storing metadata gathered in data processing system 500. For example, metadata data store 548 can be a relational database. In some examples, metadata data store 548 is an Azure SQL database. In other examples, metadata data store can be any suitable data store type. Specifically, metadata data store 548 stores the processing step definition metadata, processing step instance metadata, processing step successor definition metadata, transformation processing step instance metadata, data object artifact metadata, and data object instance metadata. Metadata data store 548 (e.g., metadata within metadata data store 548) can be accessible by users, such as developers or data analysts. Metadata data store 548 can also be connected to other applications or programs for augmenting the metadata with other information, such as visualizations, descriptions, or other documentation.

FIG. 7 depicts example schema 600 for organizing the metadata in metadata data store 548. Each of blocks 610-660 can represent a table or similar data structure. That is, each category of metadata (i.e., processing step definition metadata, processing step instance metadata, processing step successor definition metadata, transformation processing step instance metadata, data object artifact metadata, and data object instance metadata) can be stored in a corresponding table in metadata data store 548. Schema 600 can also include additional tables for organizing other categories of information, such as a subject area for each processing step 554A-554n and/or each data object 556A-556n or a stage for each processing step 554A-554n. Further, schema 600 is merely one example of an organizational structure for storing metadata from data processing system 500 (as described above), and it should be understood that other organizational structures are possible. In the example shown in FIG. 7, the dashed lines indicate relationships between the tables. Each processing step 554A-554n (block 610) can be succeeded by a processing step successor (block 620). Each execution of processing steps 554A-554n creates a corresponding instance or run of the processing step (processing step instance 640), and each processing step instance can include transformation processing step instances (block 650) for each individual transformation within the processing step. Processing steps 554A-554n produce or consume data objects 540, 556A-556n (data object artifact block 630), and each data object that is produced or consumed has a corresponding instance (block 660). Though not shown in FIG. 7 for simplicity and ease of discussion, any many-to-many relationships between ones of blocks 610-660 could also have a separate join table to resolve the many-to-many relationship. For example, one or more processing steps 554A-554n can consume one or more data objects 556A-

556*n*, so schema 600 could include a join table between data object artifact block 630 and processing step definition block 610 for consumption steps.

The operation of data processing system 500 will be described with reference to FIGS. 6-8. As illustrated in FIG. 8, a first step of process 700 for gathering metadata in data processing system 500 is to define metadata sets or categories based on the process definition of data processing system 500 (step 710). A first set of metadata that is defined can correspond to processing steps 554A-554*n* (e.g., processing step definition metadata). A second set of metadata that is defined can correspond to processing step successors of respective ones of processing steps 554A-554*n* (e.g., processing step successor definition metadata). A third set of metadata that is defined can correspond to data objects 556A-556*n* (e.g., data object artifact metadata).

At step 720 of process 700, processing steps 554A-554*n* of data processing system 500 are executed according to the process definition. For example, executing processing steps 554A-554*n* can include executing an extract-transform-load (ETL) process that is encompassed by data processing system 500. At step 730, metadata is generated during an execution of processing steps 554A-554*n* of data processing system 500. For example, the metadata generated in step 730 can include runtime metadata. The runtime metadata generated in data processing system 500 can include the processing step definition metadata, the processing step instance metadata, the processing step successor definition metadata, the transformation processing step instance metadata, the data object artifact metadata, and the data object instance metadata.

At step 740, the metadata that was generated in step 730 is stored in metadata data store 548 during a run of data processing system 500 via the execution of processing steps 554A-554*n*. For example, the metadata stored in metadata data store 548 can include the runtime metadata. Metadata data store 548 can store the processing step definition metadata, the processing step instance metadata, the processing step successor definition metadata, the transformation processing step instance metadata, the data object artifact metadata, and the data object instance metadata. Methods (code) in each of processing steps 554A-554*n* can cause corresponding metadata to be automatically populated into metadata data store 548 and organized according to schema 600.

Storing metadata in metadata data store 548 further includes forming metadata data store 548 that integrates the runtime metadata and the metadata sets of process definition metadata. For example, metadata data store 548 can integrate the runtime metadata and the metadata sets of process definition metadata when records are automatically populated into the processing step definition metadata table, the processing step successor definition metadata table, and/or the data object artifact metadata table, and these tables are correlated with the processing step instance metadata, the transformation processing step instance metadata, and/or the data object instance metadata that is also automatically recorded.

In one non-limiting example, processing step 554*n* can be an embodiment of dimension template 124 (FIGS. 1-5) such that common processing class 210 (e.g., auditing component 212 and/or transformation processing component 214) is inherited by dimension processing class 216 and can include methods for automatically populating metadata into metadata data store 548 when dimension template 124 is executed. Specifically, the methods called in dimension template 124 can populate: (a) a record into the processing step definition metadata table for dimension template 124, (b) processing step instance metadata for the execution of dimension template 124, (c) transformation processing step instance metadata for one or more transformations in dimension template 124, (d) a record into the data object artifact metadata table for any data objects 118A-118*n* that are read or written to create dimension tables 132, and (e) data object instance metadata for any data objects 118A-118*n* that were read or written to create dimension tables 132.

In another non-limiting example, processing step 554*n* can be an embodiment of fact template 126 (FIGS. 1-5) such that common processing class 210 (e.g., auditing component 212 and/or transformation processing component 214) is inherited by fact processing class 218 and can include methods for automatically populating metadata into metadata data store 548 when fact template 126 is executed. Specifically, the methods called in fact template 126 can populate: (a) a record into the processing step definition metadata table for fact template 126, (b) processing step instance metadata for the execution of fact template 126, (c) transformation processing step instance metadata for one or more transformations in fact template 126, (d) a record into the data object artifact metadata table for any data objects 118A-118*n* that are read or written to create fact table 130, and (e) data object instance metadata for any data objects 118A-118*n* that were read or written to create fact table 130.

Metadata that is generated in data processing system 500 and stored in metadata data store 548 provides a historical, data-tracking viewpoint, which can enable locating errors or inefficiencies in data processing system 500. For example, the metadata can be used to determine opportunities to optimize data processing system 500. In one example, there could be a bottleneck in the process caused by a section of inefficient code. The robust metadata in metadata data store 548, including detailed origin, lineage, and context information, can help identify the inefficient code and enable a developer to quickly improve the code. In another example, the metadata in metadata data store 548 can be used to track compliance with validity requirements in the data, such as legal, privacy, validity of inclusion, or other requirements. In one example, if a PII violation happens, a user can trace the occurrence with the metadata to find when or how the violation occurred. Similarly, in a healthcare example, the metadata could be used to verify that certain patients were not included in a particular cohort and enable a user to trace any violations of this rule.

Often, an organization will lack insight into the origin of its data (Where did the data come from?), the lifecycle or lineage of the data (What happened to the data?), and the context of the data (How is the measure calculated?). For example, tables can be combined, data types can be changed, etc., and these insights can be lost. Typically, this information about the data would have been momentarily available as the process was occurring but would not have been stored. Gathering metadata manually can be exceedingly difficult and problematic due to the outright burden of gathering so much data and because a process might fail if it depends on metadata that was not properly recorded or updated.

Moreover, commercially available data cataloging options tend to have an "outside looking in" perspective of the data so that a user might be able to obtain basic information about the data, such as counts of records read or written or—with some manual input—basic lineage information, but the user would not have access to deeper insights about the data. Data catalogs can be broadly classified as curated data catalogs, which are hand-maintained pages of information about the data, or automated data catalogs, which have some ability to "discover" data that is stored in a data store. Curated data catalogs are limited in that they are both time and labor-intensive to develop and maintain and tend to become stale or out of data quickly if they are not rigorously maintained. Automated data catalogs are limited in that they require a very large investment in human capital and management so tend to be cost-prohibitive for all but the largest organizations and the automated components still lack significant data governance and data quality aspects. In general, data catalogs lack integration with the data processing system. However, many organizations want rich auditing capabilities for their business data.

Data processing system 500 is a metadata-based system because it has a process definition that predefines a sequence of processing steps 554A-554n and respective data stores (source data store 540 and sequential data stores 546A-546n) from which data objects 542, 554A-554n are produced or consumed. Because data processing system 500 is already a metadata-based system, according to techniques of this disclosure, data processing system 500 can capture all of the information that would be available from a traditional data catalog and associate that information with details of the actual processing or runtime data. Traditional data catalogs are unable to deliver this type of integrated information.

Data processing system 500 automatically populates records and metadata in metadata data store 548, which presents a significant competitive advantage that is partially due to automation. For example, as processing steps 554A-554n are executed, metadata in metadata data store 548 is automatically maintained (kept up to date). Further, the metadata gathering can be integrated at every step of data processing system 500. Having metadata data store 548 with more robust and detailed metadata about data processing system 500 can improve an organization's trust in their data.

Additionally, the metadata in metadata data store 548 can serve as a base of information for further analytics or other uses. For example, the metadata could be used for machine learning to propose optimizations to data processing system 500 or propose alternative approaches. The metadata in metadata data store 548 can also be used by other applications that allow users to augment the metadata. For example, one of processing steps 554A-554n might include a complicated calculation; a user can access metadata data store 548 to see the transformation that was done; the metadata can be linked via an augmentation application to a diagram that explains the logic; and the user can refer to the diagram when reviewing the data to determine if the calculation was performed correctly. Thus, the robust metadata gathered from data processing system 500 enables various extensions or augmentations of the information which would not otherwise be possible.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of generating and storing metadata in a data processing system, the method comprising:
    defining a process definition of the data processing system that further defines a processing step and a processing step successor that succeeds the processing step, wherein the process definition of the data processing system is defined prior to executing an instance of the processing step in the data processing system;
    defining metadata sets of process definition metadata based on the process definition of the data processing system, the metadata sets of process definition metadata including:
        a first set of metadata corresponding to the processing step;
        a second set of metadata corresponding to the processing step successor; and
        a third set of metadata corresponding to a data object that is produced or consumed by the processing step;
    executing the instance of the processing step via a computer device according to the process definition of the data processing system;
    generating runtime metadata during an execution of the instance of the processing step, the runtime metadata including:
        metadata that corresponds to the instance of the processing step; and
        metadata that corresponds to an instance of the data object;
    storing the runtime metadata during the execution of the instance of the processing step; and
    forming a metadata data store that integrates the runtime metadata with the metadata sets of process definition metadata.

2. The method of claim 1, wherein forming the metadata data store further includes correlating the metadata that corresponds to the instance of the processing step with the first set of metadata and correlating the metadata that corresponds to the instance of the data object with the third set of metadata.

3. The method of claim 1, wherein the metadata that corresponds to the instance of the processing step includes:
    an identification of the instance of the processing step;
    a date and/or time associated with the instance of the processing step; and
    a duration associated with the instance of the processing step; and
    wherein the metadata that corresponds to the instance of the data object includes:
        an identification of the instance of the data object;
        a date and/or time associated with the instance of the data object;
        a duration associated with producing or consuming the instance of the data object;
        a record count of records that are written to produce or read to consume the instance of the data object; and
        an indication of whether the instance of the data object was produced or consumed by the processing step.

4. The method of claim 3 and further comprising:
    generating an alert if the record count of records that are read or written exceeds a record count threshold; and
    directing a user, when the alert is generated, to a code statement associated with an operation of the processing step for reading or writing the records.

5. The method of claim 1, wherein the processing step of the data processing system includes one or more transformation steps, and wherein the runtime metadata further includes metadata that corresponds to an instance of each transformation step.

6. The method of claim 5, wherein the metadata that corresponds to the instance of each transformation step includes:
- an identification of the instance of each transformation step;
- a date and/or time associated with the instance of each transformation step;
- a duration associated with the instance of each transformation step;
- a record count of records that are read or written in the instance of each transformation step;
- an indication of an operation that is performed in the instance of each transformation step; and
- a log of a code statement this is input in the instance of each transformation step.

7. The method of claim 1, wherein the first set of metadata includes:
- a processing step type;
- a subject area of the processing step; and
- a process stage associated with the processing step;

wherein the second set of metadata includes:
- an identification of the processing step successor; and
- an indication of a relationship between the processing step and the processing step successor; and wherein the third set of metadata includes:
- a data object type;
- an identification of the processing step that produced or consumed the data object; and
- a record count threshold associated with producing or consuming the data object.

8. The method of claim 1, wherein the runtime metadata is automatically generated during the execution of the instance of the processing step by methods that are included in the processing step.

9. The method of claim 1, wherein the process definition is represented in a schema of the metadata data store.

10. The method of claim 9, wherein the metadata data store is a relational database, and wherein each of the metadata sets is represented by a corresponding table that is included in the schema of the metadata data store.

11. The method of claim 1, wherein the processing step is a dimension table creation template, and wherein the data object is a dimension table that is produced by the dimension table creation template.

12. The method of claim 1, wherein the processing step is a fact table creation template, and wherein the data object is a fact table that is produced by the fact table creation template.

13. The method of claim 1, wherein the processing step is a data ingestion pipeline activity, and wherein the data object is a source data object that is consumed by the data ingestion pipeline activity.

14. The method of claim 1, wherein the data processing system includes an extract-transform-load (ETL) process.

15. A data processing system for organizing data into a data warehouse, the data processing system comprising:
- a metadata data store including metadata sets of process definition metadata that are based on a process definition of the data processing system, wherein the process definition of the data processing system defines a processing step and a processing step successor that succeeds the processing step, and wherein the process definition of the data processing system is defined prior to executing an instance of the processing step in the data processing system; the metadata sets of process definition metadata including:
  - a first set of metadata corresponding to the processing step;
  - a second set of metadata corresponding to the processing step successor; and
  - a third set of metadata corresponding to a data object that is produced or consumed by the processing step;
- one or more processors; and
- computer-readable memory encoded with instructions that, when executed by the one or more processors, cause the data processing system to:
  - access the process definition of the data processing system;
  - execute the instance of the processing step according to the process definition of the data processing system;
  - generate runtime metadata during an execution of the instance of the processing step, the runtime metadata including:
    - metadata that corresponds to the instance of the processing step; and
    - metadata that corresponds to an instance of the data object; and
  - store the runtime metadata in the metadata data store during the execution of the instance of the processing step such that the metadata data store integrates the runtime metadata with the metadata sets of process definition metadata.

16. The data processing system of claim 15, the metadata that corresponds to the instance of the processing step is correlated with the first set of metadata and the metadata that corresponds to the instance of the data object is correlated with the third set of metadata in the metadata data store.

17. The data processing system of claim 15, wherein the processing step of the data processing system includes one or more transformation steps, and wherein the runtime metadata further includes metadata that corresponds to an instance of each transformation step.

18. The data processing system of claim 15, wherein the runtime metadata is automatically generated during the execution of the instance of the processing step by methods that are included in the processing step.

* * * * *